United States Patent [19]
Sakamoto et al.

[11] Patent Number: 5,210,607
[45] Date of Patent: May 11, 1993

[54] GHOST REDUCTION DEVICE FOR REMOVING GHOST COMPONENTS OF A TELEVISION SIGNAL

[75] Inventors: Toshiyuki Sakamoto, Fujisawa; Tsutomu Noda, Yokohama; Keiro Shinkawa, Hiratsuka, all of Japan

[73] Assignee: Hitachi, Ltd., Tokyo, Japan

[21] Appl. No.: 699,917

[22] Filed: May 14, 1991

[30] Foreign Application Priority Data

May 14, 1990 [JP] Japan .................................. 2-121349
Oct. 19, 1990 [JP] Japan .................................. 2-279340

[51] Int. Cl.$^5$ ............................................. H04N 5/21
[52] U.S. Cl. ................................... 358/166; 358/167; 358/36; 358/37
[58] Field of Search .................. 358/166, 167, 36, 37

[56] References Cited

U.S. PATENT DOCUMENTS

| 4,476,491 | 10/1984 | Murata et al. | 358/167 |
| 4,559,560 | 11/1985 | Murata et al. | 358/167 |
| 4,882,614 | 11/1989 | Kageyama et al. | 358/12 |
| 5,053,870 | 11/1991 | Ito et al. | 358/167 |

FOREIGN PATENT DOCUMENTS

| 62-22307 | 5/1987 | Japan . |
| 63-121392 | 5/1988 | Japan . |
| 0038973 | 2/1991 | Japan . |
| 3-73677 | 3/1991 | Japan . |

OTHER PUBLICATIONS

Development of a Ghost Cancel Reference Signal for TV Broadcasting, IEEE Transactions on Broadcasting vol. 35, No. 4, Dec. 1989.
New Ghost Reduction Tuner Using a Training Method, IEEE Transaction on Consumer Electronics, vol. 36, No. 3, Aug. 1990.
Technical Report of the Institute of Television Engineers of Japan vol. 13, No. 32 pp. 1-36 (1989, 6).

*Primary Examiner*—James J. Groody
*Assistant Examiner*—Glenton B. Burgess
*Attorney, Agent, or Firm*—Antonelli, Terry, Stout & Kraus

[57] ABSTRACT

A ghost elimination device equipped in a television receiver extracts a reference signal from the television signal, the reference signal being inserted in the television signal in a certain sequence or at random with the intention of ghost elimination, implements the sequence decoding process and noise elimination process for the reference signal, and controls the characteristics of the ghost eliminating transversal filter which suppresses the transmission distortion. The device includes a sequence decoding circuit for decoding the transmission sequence of the reference signal, a transversal filter for suppressing the distortion of transmission path disposed in a rear stage of sequence decoding circuit, and a controller which introduces the reference signal provided by the filter to control the characteristics of the filter or apply the output of the sequence decoding circuit to the transversal filter through a noise elimination filter. The transversal filter has a tapped delay line formed of registers with an initialization terminal and an input terminal for controlling the initialization terminal.

17 Claims, 24 Drawing Sheets

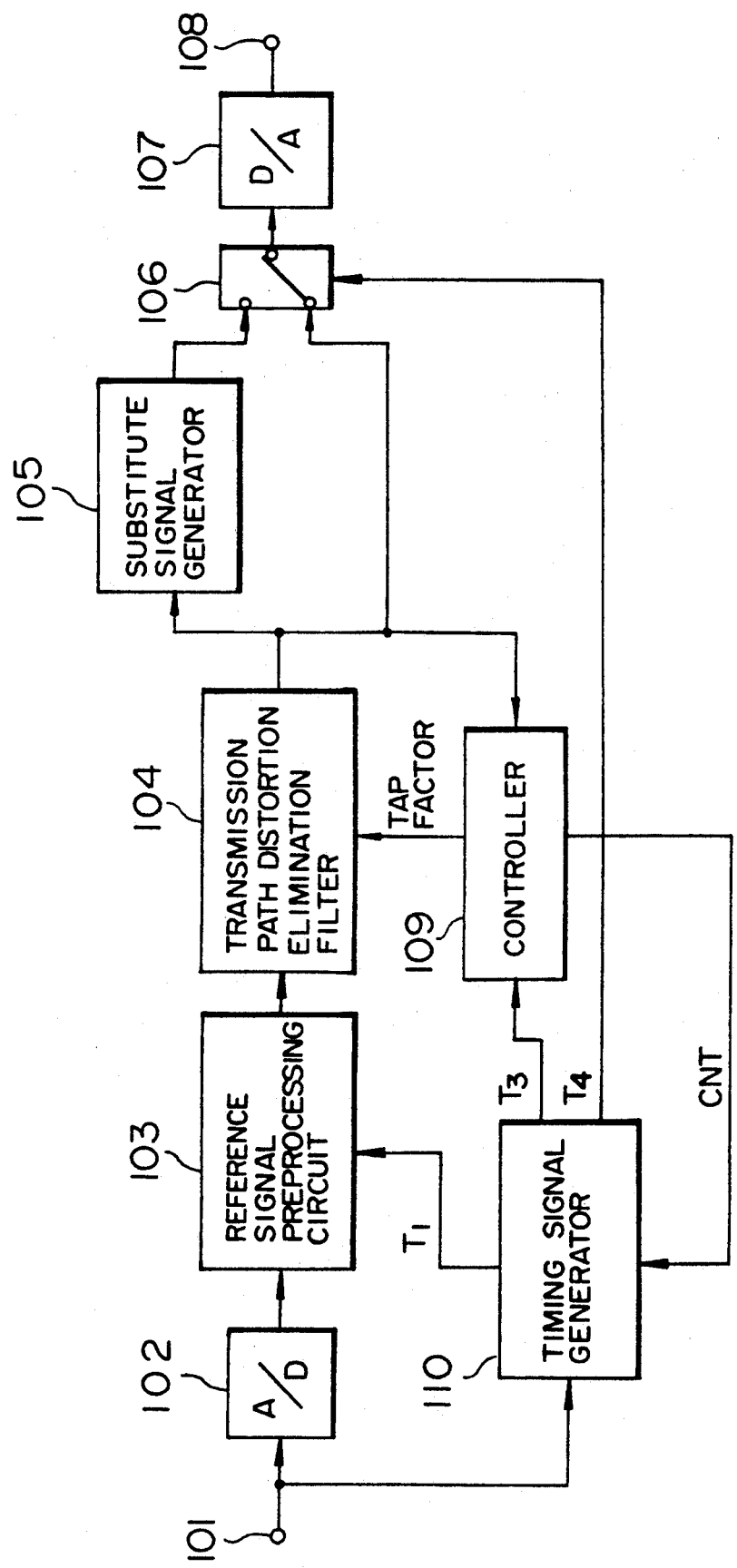

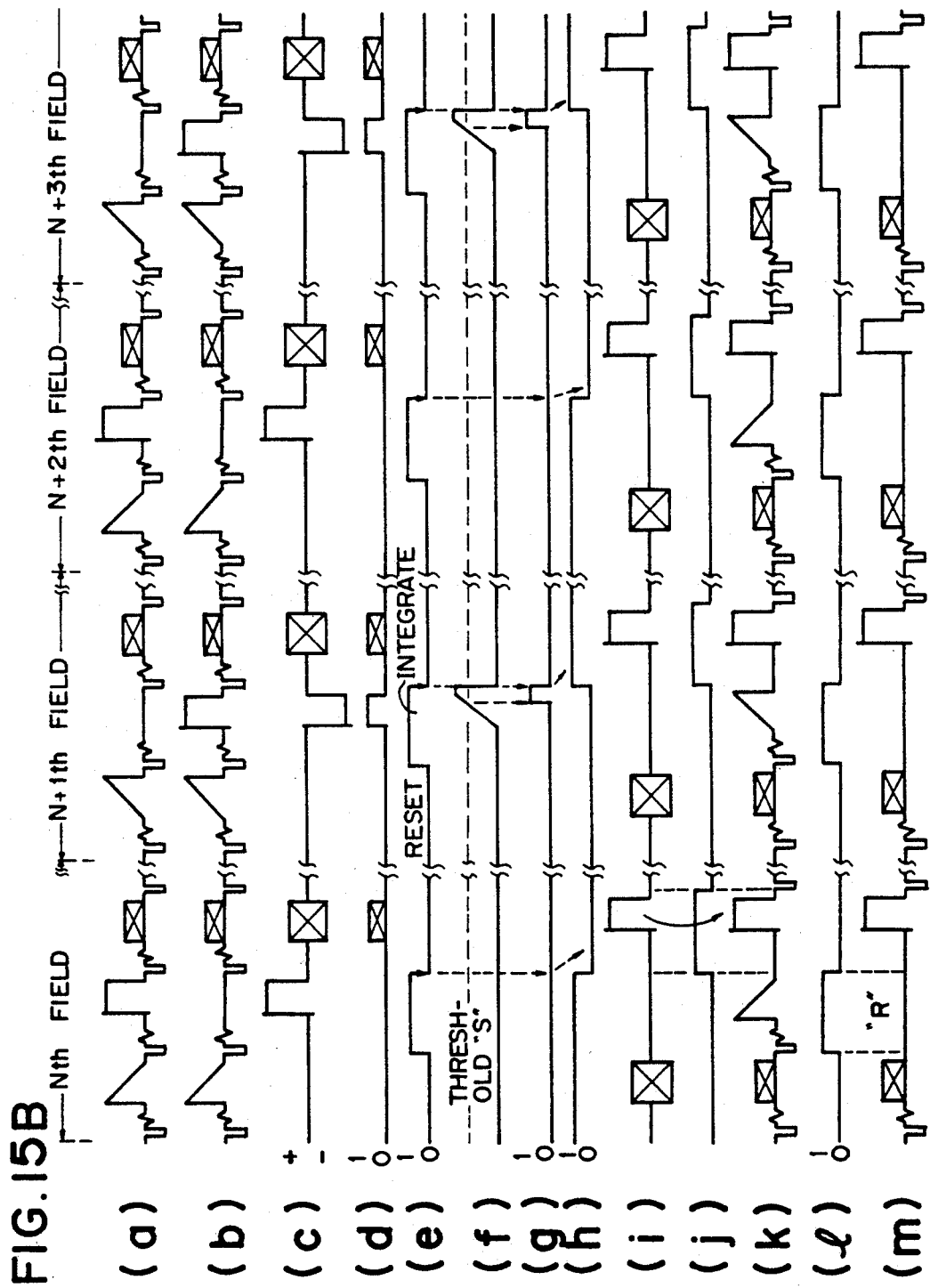

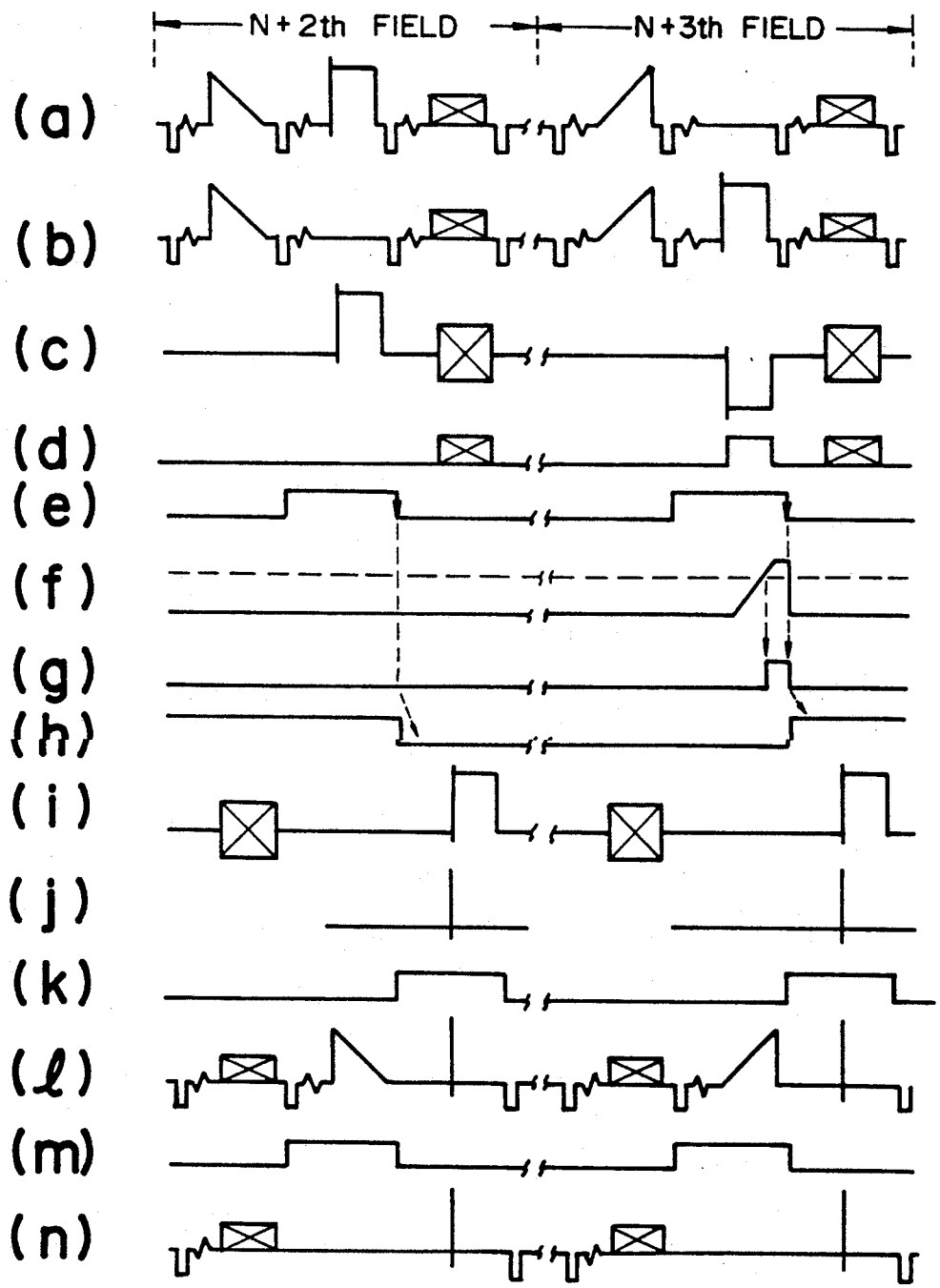

GHOST REDUCTION DEVICE FOR REMOVING GHOST COMPONENTS OF A TELEVISION SIGNAL

BACKGROUND OF THE INVENTION

This invention relates to a ghost elimination device for removing, from a television signal, a ghost component created by the distortion of the transmission path of the television signal.

In receiving a television signal broadcasted by a television station, the distortion of transmission path caused by reflection waves, which are created by such obstacles as tall buildings and mountains, superimposed on the direct wave is called "ghost", and it is a major cause of deteriorated picture quality in the ground television broadcasting system.

In order to regain the picture quality which has been spoiled by the ghost, there have been developed methods and devices for eliminating the ghost, in which a reference signal for ghost elimination is transmitted from the broadcasting station and the signal is used by receivers to detect and remove the ghost, as described in the Technical Report of the Institute of Television Engineers of Japan, Vol. 13, No. 32, pp. 1–36, published in June 1986.

In general, a television signal received by a receiver is presumed to include a great deal of noise, and accordingly ghost information detected based on the reference signal very likely includes errors, and therefore the performance of ghost elimination will be degraded.

A means of overcoming this problem is known, as described in Japanese Patent Publication No. 62-22307. This technique is based on the provision of a noise elimination circuit connected to the output of a distortion elimination filter which suppresses the transmission path distortion (ghost) and a control circuit which receives the output of the noise elimination circuit to control the filter thereby to suppress the noise included in the reference signal for the achievement of error prevention in the ghost information.

With regard to the reference signal for ghost elimination, the above-mentioned technical report describes, in its paragraph on page 31 for the principle of ghost elimination, that ghost up to about 4 μm can be detected through the computational process for the GCR (Ghost Cancel Reference) signal.

The ghost elimination device using the GCR signal employs a control circuit connected to the output of a distortion elimination filter (transversal filter) which suppresses the transmission path distortion (ghost), and the control circuit processes the GCR signal to detect the distortion information of the transmission path and manipulates the tap factor of the distortion elimination filter thereby to remove the ghost.

However, the foregoing prior art involves a problem of increased time needed for the removal of distortion (removal of ghost). The above-mentioned noise elimination circuit bases its noise suppression on synchronous addition which utilizes the randomness of noise generation among fields in contrast to the significant signal that has a correlation among fields, and its n-time synchronous addition fields an s/n improvement factor of $\sqrt{n}$, i.e., an s/n improvement of about 20 dB requires synchronous addition 100 times.

The above-mentioned control circuit calculates the tap factor of the transversal filter, which constitutes the distortion elimination filter, from the reference signal with its noise being suppressed, and revises the tap factor accordingly. This operation takes place many times iteratively, and in consequence the distortion of the transmission path is eliminated.

The filter has different characteristics before and after the revision of tap factor and the correlation is lost for distortions impressed on the reference signal, and therefore the noise elimination circuit cannot use the results of synchronous addition obtained up to the previous factor revision. This situation requires n-time synchronous addition at each revision of tap factor, resulting in an extended noise elimination time.

The GCR signal is formed in a sequence of patterns which cycles in eight fields, as shown in FIG. 1 on page 31 of the above-mentioned Technical Report of the Institute of Television Engineers of Japan, Vol. 13, No. 32, and also will be explained later in this specification, in order to avoid erroneous detection due to the mixing of a distortion component of the previous line. A signal inserted to the previous line is the VIT (Vertical Interval Test) signal, which has a fixed pattern at least among even fields and among odd fields each.

For the detection of the transmission path distortion from the GCR signal by being free from the influence of the distortion of the previous line, it is necessary to decode the transmission sequence of the GCR signal by using signals of eight fields through such computation as $(S1-S5)+(S6-S2)+(S3-S7)+(S8-S4)$, as will be explained in detail later.

For the suppression of distortion on the transmission path, the above-mentioned control circuit calculates the tap factor of the distortion elimination filter based on the signal produced by the above computation process, and updates the tap factor. This operation takes place many times iteratively, and in consequence the distortion of the transmission path is eliminated.

The filter has different characteristics before and after the revision of tap coefficient factor and the correlation of distortions impressed on the GCR signal is lost. On this account, the use of signals before and after the tap factor revision for the above computation process will result in a faulty detection of the distortion information. Otherwise, it takes a wait time of eight fields for the decoding operation at each revision of tap factor, resulting in a long distortion elimination time.

SUMMARY OF THE INVENTION

An object of this invention is to solve the foregoing prior art deficiency and provide a ghost elimination device capable of reducing the time needed for the elimination of the transmission path distortion.

The above objective is achieved through the provision of a reference signal preprocessing means which implements a decoding process for decoding the transmission sequence of a GCR signal that is multiplexed with the television signal for ghost elimination and the noise elimination process for eliminating noise, a transmission path distortion elimination filter for suppressing the transmission distortion disposed in a post stage of the reference signal preprocessing means, and control means which introduces the reference signal processed by the reference signal preprocessing means and conducted through the transmission path distortion elimination filter, thereby controlling the characteristics of the distortion elimination filter.

The reference signal preprocessing means decodes the transmission sequence of the GCR signal, and removes the noise when necessary, and delivers a reference signal which has been processed for use in ghost elimination. The resulting reference signal is fed to the control means through the distortion elimination filter.

The control means produces a sinX/X pulse from the reference signal received through the distortion elimination filter, evaluates the difference between this pulse and another sinX/X pulse without ghost provided in the receiver thereby to detect the ghost, and calculates and revises the tap factor of the distortion elimination filter. This operation takes place many times iteratively, and in consequence the distortion on the transmission path is eliminated.

Since the distortion component impressed on the reference signal does not vary in the front stage of the distortion elimination filter, the reference signal preprocessing means in this stage for the sequence decoding process and noise elimination process can operate always by use of signals earlier by eight fields or more.

Accordingly, the control means can control the distortion elimination filter through the intact use of the reference signal which has been rendered the sequence decoding process and the like, and the overall ghost elimination time can be reduced.

According to this invention, the noise elimination process for the GCR signal is sped up in the case of using a noise elimination filter, and the ghost elimination time can be reduced.

It also becomes possible to provide the user with pictures with enhanced s/n characteristics through the noise elimination for the picture signal by using the noise elimination process circuit for the GCR signal. The iterative processes of ghost elimination can be sped up by application of the fast noise elimination process to the GCR signal which has been rendered the field sequence process, and the ghost elimination time can further be reduced.

Moreover, in the case of a serial connection of ghost elimination devices, it is possible to prevent the erroneous operation of a ghost elimination device in the rear stage by blocking the GCR signal during the fast operation mode.

According to this invention, when the sequence decoding circuit is replaced with a noise elimination filter, the sequence decoding process for the GCR signal can be sped up in an inexpensive manner, and the time expended for iterative processes of ghost elimination can be reduced.

BRIEF DESCRIPTION OF THE DRAWINGS

FIG. 1 is a block diagram of a basic embodiment of a ghost elimination device according to this invention;

FIG. 15B is a waveform diagram showing the major signal waveforms of the circuit shown in FIG. 15A;

FIGS. 16B-1 and 16B-2 are waveform diagrams showing the major signal waveforms of the circuit shown in FIG. 16A;

DESCRIPTION OF THE PREFERRED EMBODIMENTS

Figure 16A:
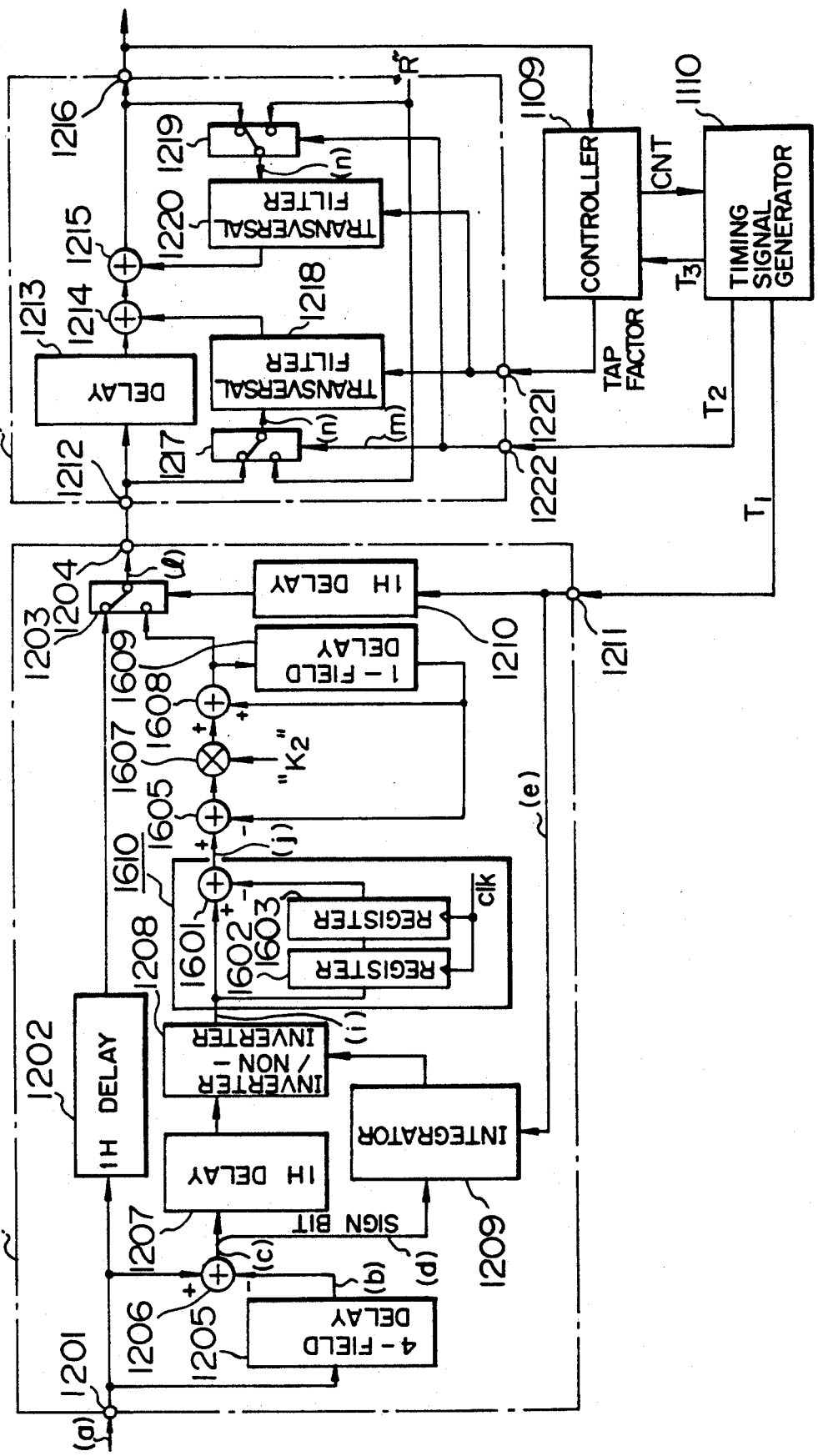
FIG. 16A is a block diagram showing a modified arrangement of the circuit shown in FIG. 15A.
Figures 1, 16B:
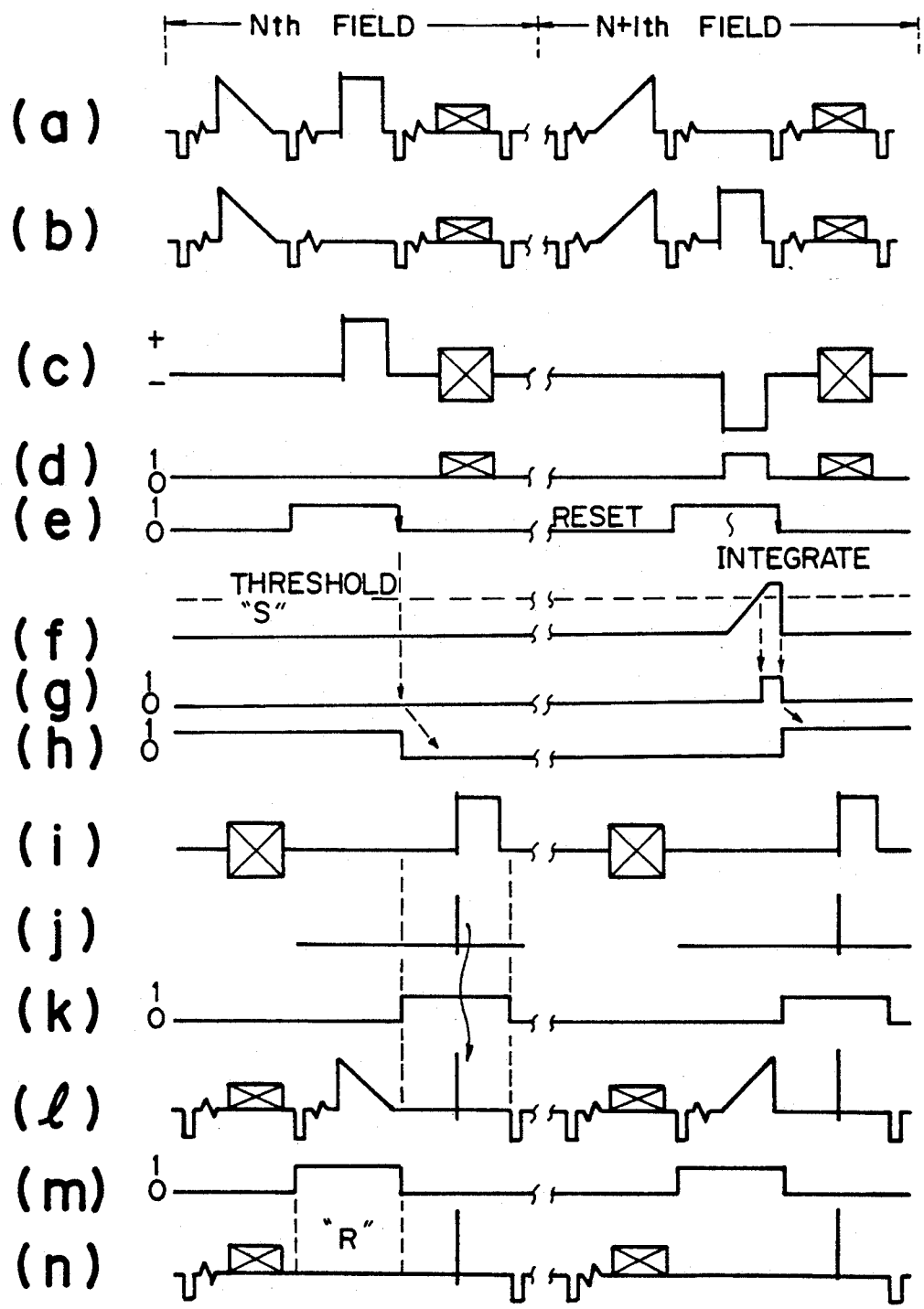

FIG. 1 shows an arrangement of a basic embodiment of this invention. In the figure, indicated by 101 is an input terminal of the television signal, 102 is an analog-to-digital converter (A/D converter), 103 is a reference signal preprocessing circuit, 104 is a transmission path distortion elimination filter, 105 is a substitute signal generator, 106 is a switch circuit, 107 is a digital-to-analog converter (D/A converter), 108 is an output terminal of the television signal, 109 is a controller, and 110 is a timing signal generator.

The television signal entered through the input terminal 101 is fed to the timing signal generator 110, in which the sync signals and color burst are separated and timing signals T1, T3 and T4 synchronous to these signals and the system clock used in the ghost elimination device are reproduced. The television signal is also fed to the A/D converter 102, in which the signal is converted into a digital signal, and it is fed to the input of the reference signal preprocessing circuit 103.

The reference signal preprocessing circuit 103 implements the preprocessing for the received GCR signal with the intention of reducing the ghost elimination time. The preprocessing decodes the signal which is the alternate transmission of the reference signal and pedestal signal in compliance with the 8-field transmission sequence, for example, and it further includes the sequence decoding process for extracting the reference signal in every field and the noise elimination process for removing the noise in the reference signal.

The reference signal for ghost elimination produced by these processes is inserted to the television signal in its vertical flyback period by being timed to the timing signal T1 provided by the timing signal generator 110, and the resulting timing signal is fed to the input of the transmission path distortion elimination filter 104.

The transmission path distortion elimination filter 104 produces a distortion signal, which is opposite in polarity to the distortion on the transmission path, from the input television signal by using a transversal filter, and adds the distortion signal to the original signal, thereby eliminating the distortion.

The transversal filter is made up of a serial connection of tapped delay lines, multipliers which multiply factors to the outputs of the delay lines and an adder which sums the outputs of the multipliers, for example, as it is known in the art, and the filter is further provided with at least an input terminal connected to the tapped delay line, an input terminal for applying factors to the multipliers, and an output terminal for delivering the output of the adder. The input of the tapped delay line is supplied with the television signal and the factor input terminal is connected to the controller 109, and the transversal filter produces a distortion which is opposite in polarity to the distortion on the transmission path through the control of factors (tap factors) of the tap multipliers by the controller 109.

The controller 109 introduces the reference signal, which has passed through the transmission path distortion elimination filter 104, in response to the timing signal T3 provided by the timing signal generator 110 thereby to obtain the sinX/X pulse from the signal, and it evaluates the delay time of distortion (ghost) through the comparison of the pulse with the reference signal provided in the receiver. Accordingly, the controller 109 can control the generation of a distortion elimination signal by controlling the factors of tap multipliers in the transversal filter in correspondence to the detected delay time.

As a result of distortion elimination by the transversal filter under control of the controller 109, the reference signal which is introduced next has its distortion component suppressed, and the residual distortion is detected in the reference signal for the modification of tap factor. This operation takes places many times iteratively so that the residual distortion is suppressed progressively, and the distortion on the transmission path is eliminated ultimately.

Since the reference signal introduced to the controller 109 is rendered the transmission sequence decoding and noise elimination processes in the front stage of the transmission path distortion elimination filter 104 without the variation of distortion caused by the noise elimination process, the controller 109 does not need the time for these processes, whereby the time expended for the iterative processes of distortion elimination can be reduced. For example, in case the decoding process for the transmission sequence is implemented by the reference signal preprocessing circuit 103, in which the process based on the signals in the past is always possible, one reference signal is extracted by using signals of eight fields conventionally, whereas the use of a reference signal which is decoded in each field is now possible and the processing time for decoding the transmission sequence can be eliminated.

Through the noise elimination process for the sequence-decoded reference signal, the reference signal with improved s/n characteristics can always be supplied to the controller 109 in every field, which eliminates the need of the noise elimination process at each distortion elimination operation in the conventional scheme, and the processing time can further be reduced.

The transmitted reference signal has a bar waveform which is derived from the integrated sinX/X pulse, and therefore the reference signal resulting from the foregoing process has the bar waveform. The controller 109 differentiates the bar waveform to restore the sinX/X pulse, and compares it with the reference signal (sinX/X pulse) provided in it. This differentiation process is one sort of filtering, and it is in a relation of serial connection with the transmission path distortion elimination filter 104. Accordingly, these two filters are interchangeable, and the differentiation process can be located in the front stage of the transmission path distortion elimination filter 104, i.e., in the reference signal preprocessing circuit 103. In this case, the controller 109 can eliminate this processing time.

It is also possible for the reference signal preprocessing circuit 103 to confine the process to the noise elimination for the GCR signal, and in this case the time expended for the noise elimination process can be reduced.

According to this embodiment, the reference signal which has been rendered the sequence decoding process and noise elimination process can always be supplied to the controller 109, and the time for the decoding process and differentiation process for the 8-field sequence at each tap factor revision and the noise elimination process can be eliminated, and the time expended for the iterative processes of distortion elimination can be reduced.

Next, the implementation of distortion elimination in a short time will be considered. In this case, the transmission characteristics varies sharply. For example, in case a relay station or the like is equipped with a ghost elimination device and a receiver is also provided with a ghost elimination device, the rear-stage (receiver) device may possibly malfunction due to the fast ghost eliminating operation of the front-stage (relay station) device.

It is assumed that before the relay station attempts to remove the ghost from the broadcasted wave and the wave including the ghost is received intact by the receiver, in which the ghost elimination device is active to eliminate the ghost. In this state, if the relay station has its ghost elimination device starting operation and transmitting a broadcast wave with the ghost being suppressed, it is received by the receiver. The receiver's ghost elimination device which has been adapted to the ghost-inclusive wave cannot respond to the ghost-suppressed wave, and it adversely appends a ghost to the ghost-suppressed wave.

In order to prevent such malfunctioning, according to this invention, at least the GCR signal is replaced with other signal during the fast ghost eliminating operation which changes the distortion of transmission system abruptly, so that the rear-stage ghost elimination device cannot detect the GCR signal and thus does not operate for ghost elimination. In this manner, the rear-stage ghost elimination device is disactivated and its malfunctioning can be prevented.

An embodiment of this scheme will be explained on FIG. 1.

The television signal provided on the output terminal of the transmission path distortion elimination filter 104 is fed to the input of the substitute signal generator 105 and one input of the switch circuit 106, which has another input connected to the output of the substitute signal generator 105.

The switch circuit 106 has its output converted into an analog television signal by the D/A converter 107, and it is delivered to the output terminal 108. The timing signal T4 produced by the timing signal generator 110 is fed to the control terminal of the switch circuit 106. The substitute signal generator 105 is a 2H (H denotes a horizontal sync period) delay circuit, for example, and it produces a 2H-delayed version of its input signal.

The switch circuit 106 operates in response to the timing signal T4 to select the signal from the substitute signal generator 105 for the line with the insertion of GCR signal. By setting the multiplexed line of the preprocessed reference signal to the line of original GCR signal, they can be protected even if the sync signal and color burst are cancelled out by the preprocessing.

Consequently, the television signal on the output terminal 108 has its GCR signal inserted line multiplexed by the signal earlier by 2H, causing the post-stage ghost elimination device to be incapable of detecting the GCR signal. Because of the multiplexing of a 2H preceding signal, the continuity of the color burst is retained (the color burst reverses the polarity in every 1H period in the NTSC system).

As the residual distortion becomes small, the transmission of GCR signal is restored by quitting its replacement with other signal thereby to make the ghost elimination device operative, so that elimination of distortion on the transmission path from the front-stage to rear-stage ghost elimination device is resumed.

This operation is based on the continuous evaluation of transmission distortion by the controller 109, which enables the device to have a decision condition, e.g., a residual distortion below a threshold or a residual distortion relative to the initial distortion. The controller 109 controls the timing signals T1, T2 and T4 by using the control signal CNT supplied to the timing signal generator 110 depending on the result of judgement, so that the insertion process and differential process for the decode-processed GCR signal and the replacement prescribed for the GCR signal are halted, but instead the input GCR signal is delivered to the output terminal 108.

Consequently, the rear-stage ghost elimination device is made operative to implement the elimination of distortion on the transmission path from the front-stage to rear-stage ghost elimination device.

In this case, the GCR signal fed to the controller 109 is also replaced with the original signal which has not been preprocessed. In this state, if it is intended to continue the distortion elimination operation or observe the change in the transmission distortion, it is made possible by switching the operation of the controller 109 to the conventional process.

According to this embodiment, of the case of a serial connection of ghost elimination devices, the rear-stage ghost elimination device can be inactivated during the operation of the front-stage ghost elimination device by inhibiting the transfer of the GCR signal, whereby malfunctioning due to the simultaneous operations of the front-stage and rear-stage devices can be prevented.

In case the preprocessed reference signal is inserted back to a line different from the original GCR signal multiplexed line, it is necessary for the line of insertion of preprocessed reference signal to have the sync signal and color burst protected, and it is made possible by varying the timing signal T4 such that the output of the substitute signal generator 105 is selected for both lines. In this case, the preprocessed reference signal can always be introduced to the controller 109, and the switching of process of the controller 109 is made unnecessary.

Figure 2:
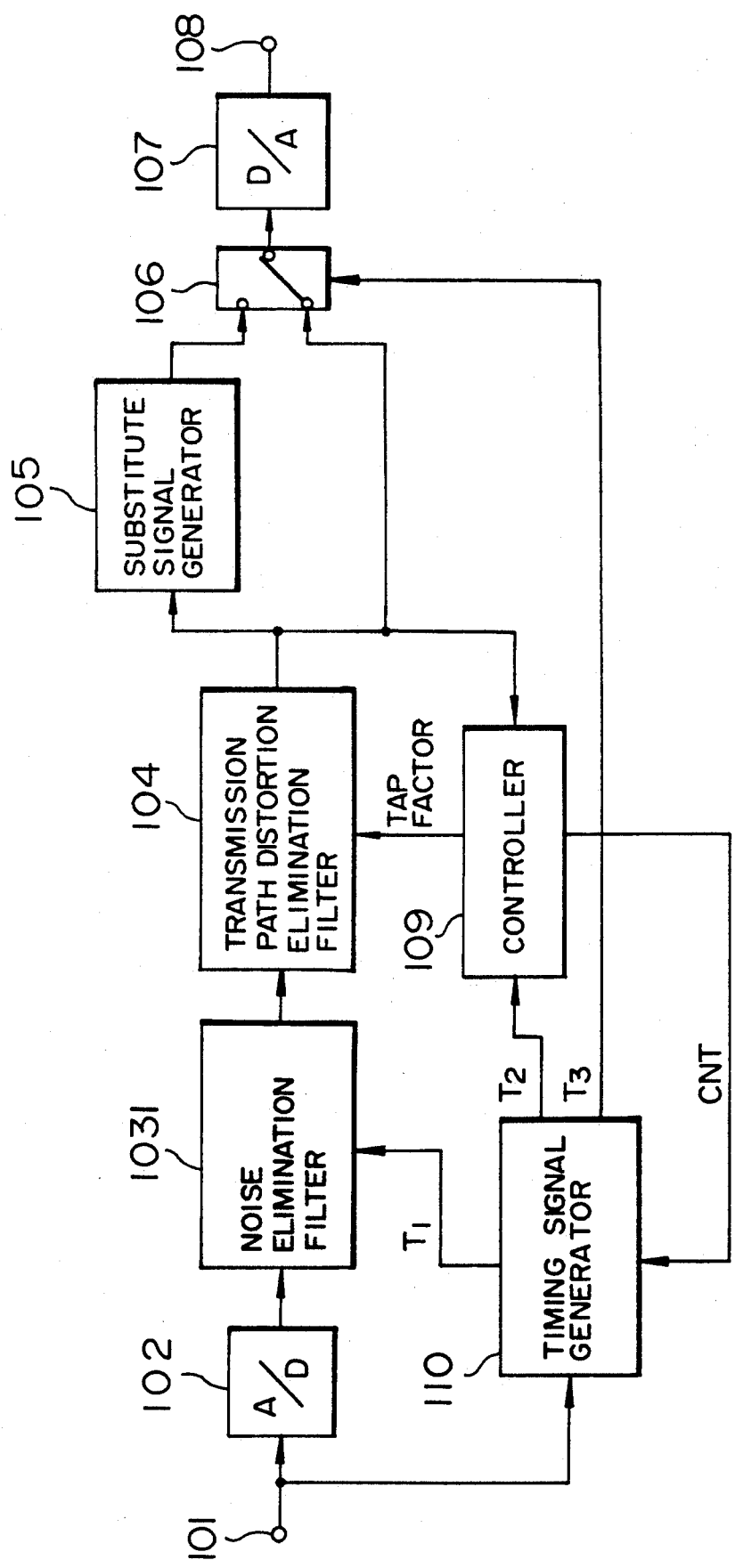
FIG. 2 is a block diagram of a specific arrangement of the embodiment.

FIG. 2 is a block diagram showing a next embodiment of this invention. In the figure, indicated by 101 is an input terminal of the television signal, 102 is an alanog-to-digital converter (A/D converter), 1031 is a noise elimination filter, 104 is a transmission path distortion elimination filter, 105 is a substitute signal generator, 106 is a switch circuit, 107 is a digital-to-analog converter (D/A converter), 108 is an output terminal of the television signal, 109 is a controller, and 110 is a timing signal generator.

Figure 3:
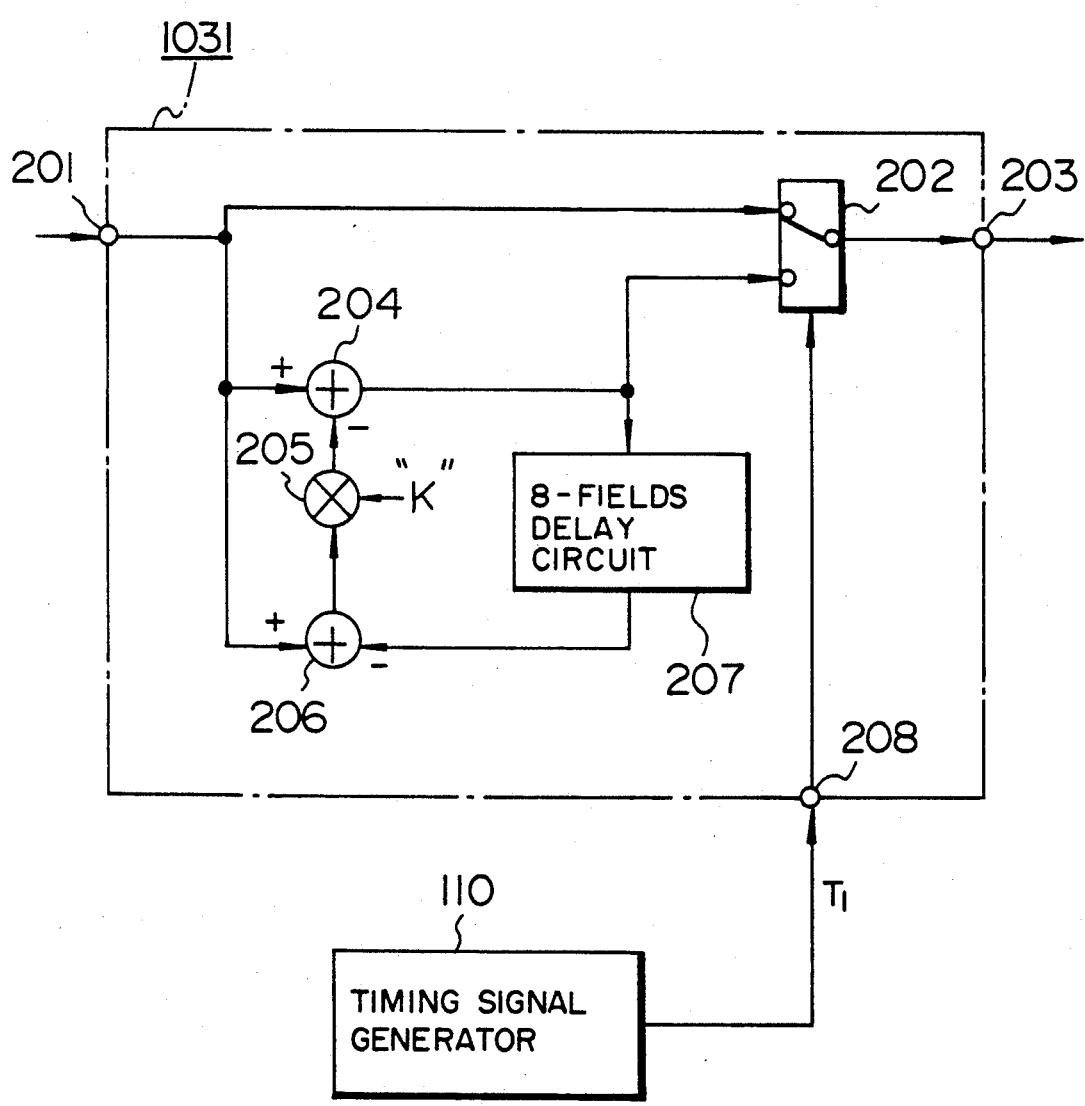
FIG. 3 is a block diagram showing a specific arrangement of the noise elimination filter in FIG. 2.

FIG. 3 is a block diagram showing a specific arrangement of the noise elimination filter 1031 in FIG. 2, in which indicated by 202 is a switch circuit, 203 is an output terminal of the television signal, 204 and 206 are subtracters, 205 is a multiplier, 207 is an 8-field delay circuit, and 208 is an input terminal of the timing signal T1.

In FIG. 2, the television signal entered through the input terminal 101 is fed to the timing signal generator 110, in which the sync signals and color burst included in the television signal are separated and timing signals T1, T2 and T3 synchronous to these signals and system clock used in the ghost elimination device are reproduced. The television signal is also fed to the A/D converter 102, in which the signal is sampled by the system clock (not shown) reproduced by the timing signal generator 110 and converted into an N-bit digital signal.

The noise elimination filter 1031, which has already be mentioned, is configured as shown in FIG. 3 for example, and it operates to suppress the noise included in the GCR signal. The television signal coming out of the A/D converter 102 is applied to the input terminal 201 of the filter, and it is fed to one inputs of the subtracters 204 and 205 and switch circuit 202 which constitute the noise elimination filter 103.

The subtracter 204 has another input and implements subtraction for the inputs with polarities indicated in the figure, and delivers the output to the input of the 8-field delay circuit 207 and another input of the switch circuit 202. The 8-field delay circuit 207 delays the input signal by eight fields and delivers the result to another input of the subtracter 206. The subtracter 206 implements subtraction for the signals with polarities indicated in the figure, and the output is multiplied by a factor K ($0 < K < 1$) by the multiplier 205 and fed to another input of the subtracter 204.

The content of the GCR signal will be explained here for the easy understanding of the circuit operation.

Figure 13:
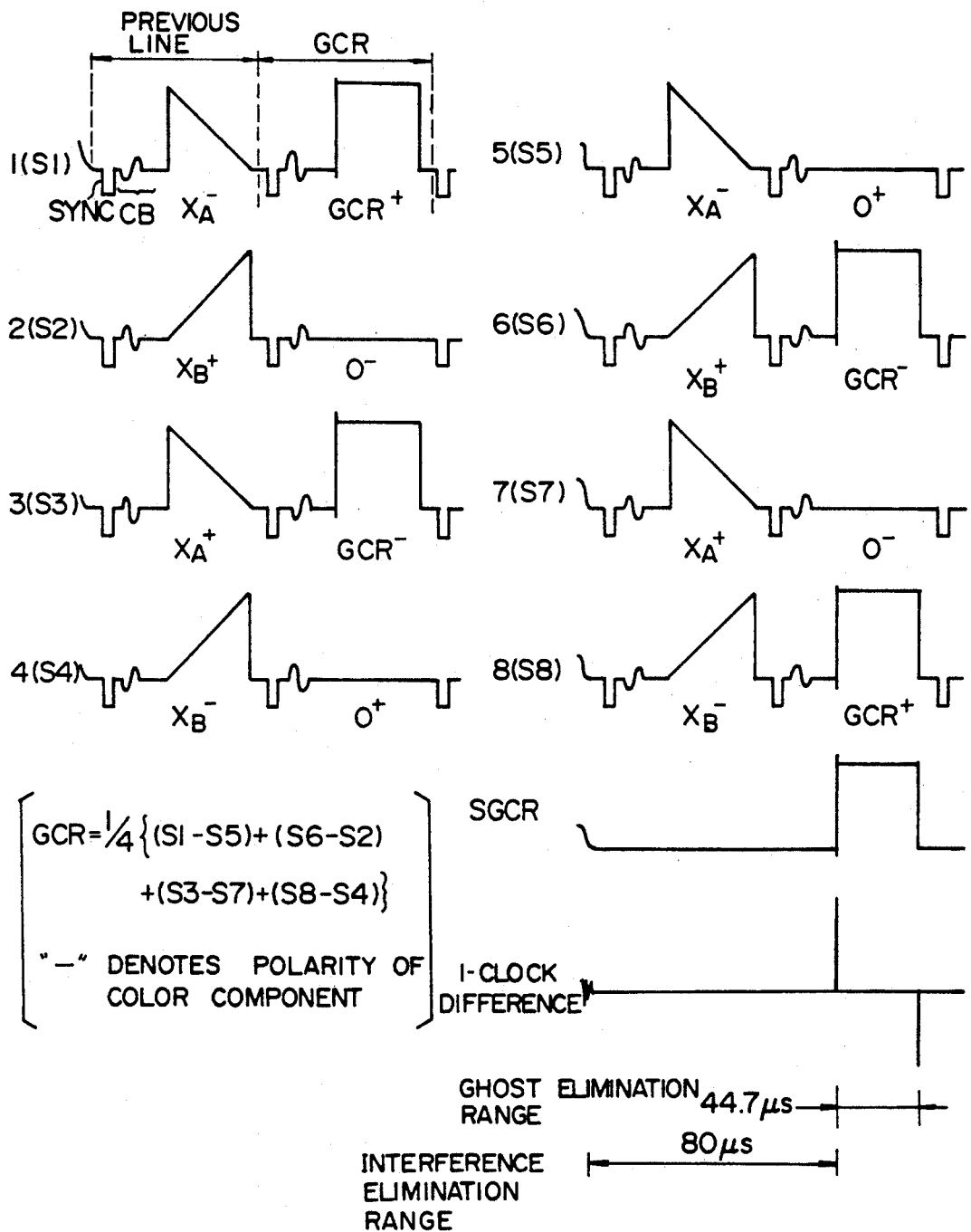
FIG. 13 is a conceptual diagram showing the sequence of eight fields of the GCR signal.

According to the above-mentioned publication, the GCR signal is formed in a sequence of patterns which cycles in eight fields as shown in FIG. 13 in order to avoid its erroneous detection in the receiver due to the mixing of a distortion component from the previous line. A signal inserted to the previous line is the VIT (Vertical Interval Test) signal, which has a fixed pattern at least among even fields and among odd fields each.

The GCR signal will be explained in detail. In FIG. 13, the signal pattern is labeled as 1(S1) for the first field, for example. In the first field, the GCR waveform is inserted in one line and the VIT signal is inserted in the previous line. Indicated by "sync" is the horizontal sync pulse and "CB" is the color burst waveform. For the second field 2(S2), the GCR waveform is absent on the line. The third field 3(S3) has the GCR waveform in the line, and the fourth field 4(S4) does not have the GCR waveform on the line. Similarly, the fifth field 5(S5) does not have the GCR waveform on the line, the sixth field has the GCR waveform on the line, the seventh field does not have the GCR waveform on the line, and the eighth field 8(S8) has the GCR waveform on the line, as will be appreciated from the figure.

The reference signal (GCR signal) included in certain ones of the 8-field sequential signal patterns multiplexed with the television signal at broadcasting has been standardized for the purpose of ghost detection, although the in-course affair of standardization will not be mentioned here. The significant features of the reference signal (GCR signal) are its formation in the cyclical sequence patterns of eight fields and different insertion positions of the GCR waveform between the former four fields and latter four fields. The signal patterns suggest that the GCR waveform (SGCR) is obtained for each field through the decoding of the GCR signal by evaluating four sets of differences between two signals with a 4-field interval and averaging these differences, as follows.

$$SGCR = \frac{1}{4}\{(S1-S5)+(S6-S2)+(S3-S7)+(S8-S4)\}$$

In the vertical flyback period where the GCR waveform is inserted, two inputs of the subtracter 206 in FIG. 3 have always the same signal pattern because of its input signals with an 8-field difference, and accordingly the resulting signal of subtraction is only random noise components. The noise signal is multiplied by a factor K by the multiplier 205 and then it is subtracted from the original signal by the subtracter 204, which produces on its output a GCR waveform with noise components being removed.

It is known generally that the time constant T of the noise elimination filter and the degree of s/n improvement are evaluated as follows.

$$s/n \text{ improvement} = 10 \log (1+K)/(1-K) \text{ dB} \ldots \quad (1)$$

$$T = -1/(lnk) \times 8/fv \text{ sec} \ldots \quad (2)$$

where fv is the field frequency.

Accordingly, the subtracter 204 produces for every field the improved GCR waveform with a delay of the time constant T following the signal input.

During the picture signal period, however, in which the signal may vary in part between frames (movement of picture), extraction of the picture signal on the output of the subtracter 204 will result in such a problem as blurred moving pictures (persistence effect).

To cope with this matter, the timing signal T1 received on the input terminal 208 is applied to the control terminal of the switch circuit 202 so that the signal on the input terminal 201 is conducted directly to the output terminal 203 during the picture signal period. The timing signal T1 may be any signal which is timed to the vertical flyback period and has a pulse width equal to the period. Through the control of the switch circuit 202 based on the above-mentioned timing relation, the GCR signal can be rid of noise without the emergence of the persistence problem.

Following the foregoing process, the signal is conducted through the transmission path distortion elimination filter 104 having a transfer function shown by equations (3) to (5), and then fed to the controller 109.

$$F(Z) = F1(Z) \cdot F2(Z) \ldots \quad (3)$$

$$F1(Z) = K_n Z^n + K_{n-1} \cdot Z^{n-1} + \ldots + K_0 + \ldots + K_{m-1} \cdot Z^{-(m-11)} + Z^{-m} \ldots \quad (4)$$

$$F2(Z) = 1/(K_{-(m-1)} \cdot Z^{-(m+1)} + K_{-(m+2)} \cdot Z^{-(m+2)} + \ldots + K_{-(m+p)} \cdot Z^{-(m+p)}) \ldots \quad (5)$$

where K is the tap factor, Z is the operator of Z transformation, and superscripts and subscripts n, m and p are positive integers.

The controller 109 introduces the GCR signal in response to the timing signal T2. This GCR signal has already been rendered the noise elimination process, and it is used intact in the 8-field sequence computation and 1-clock difference process thereby to detect the distortion component of the transmission path, as described in the above-mentioned publication (the controller 109 holds the GCR signal coming over the transmission path at the time without ghost, and it is compared with the GCR signal coming over the transmission path at the time with ghost thereby to detect the ghost component).

The tap factor which determines the correction characteristics of the transmission path distortion elimination filter 104 is evaluated from the detected distortion component and it is imparted to the filter 104. In consequence, the next GCR signal has its distortion component suppressed, and the residual distortion is detected from the GCR signal and used for the tap factor correction. This operation is repeated many times, and the distortion on the transmission path is removed progressively.

The 8-field sequence computation utilizes the correlation of signals between fields to eliminate the distortion component mixed in the GCR signal based on the previous line, sync signal and color burst. Accordingly, it is not desirable to carry out the computation using signals before and after the tap factor revision because of a lower correlation of distortion components. The controller 109 is provided with a buffer memory for storing the GCR signal earlier by four fields and the GCR signal of the current field, and it controls every five field by implementing the above computation and detection of distortion after the factor has been revised.

Accordingly, this embodiment is capable of detecting the distortion and correcting the tap factor for every five field with a time lag of the time constant T of the noise elimination filter 1031 following the signal input. For example, the time needed for an s/n improvement by 20 dB through the 60 cyclic distortion eliminating operations is calculated as follows. The conventional method requires synchronous addition 100 times in each operation and the period of field is about 1/60 sec in the NTSC system, and accordingly the necessary time length t1 is: $t_1 = 100 \times 60 \times 1/60 = 100$ sec. According to this invention, the tap factor K for accomplishing a 20 dB s/n improvement is about 0.98, and the necessary time $t_2$ is:

$$t_2 = -1/ln(0.98) \times 8/60 + 5 \times 60 \times 1/60 = 6.6 + 5 = 11.6 \text{ sec.}$$

Namely, the processing time can be reduced to about 1/10 of the conventional result.

Figure 4:
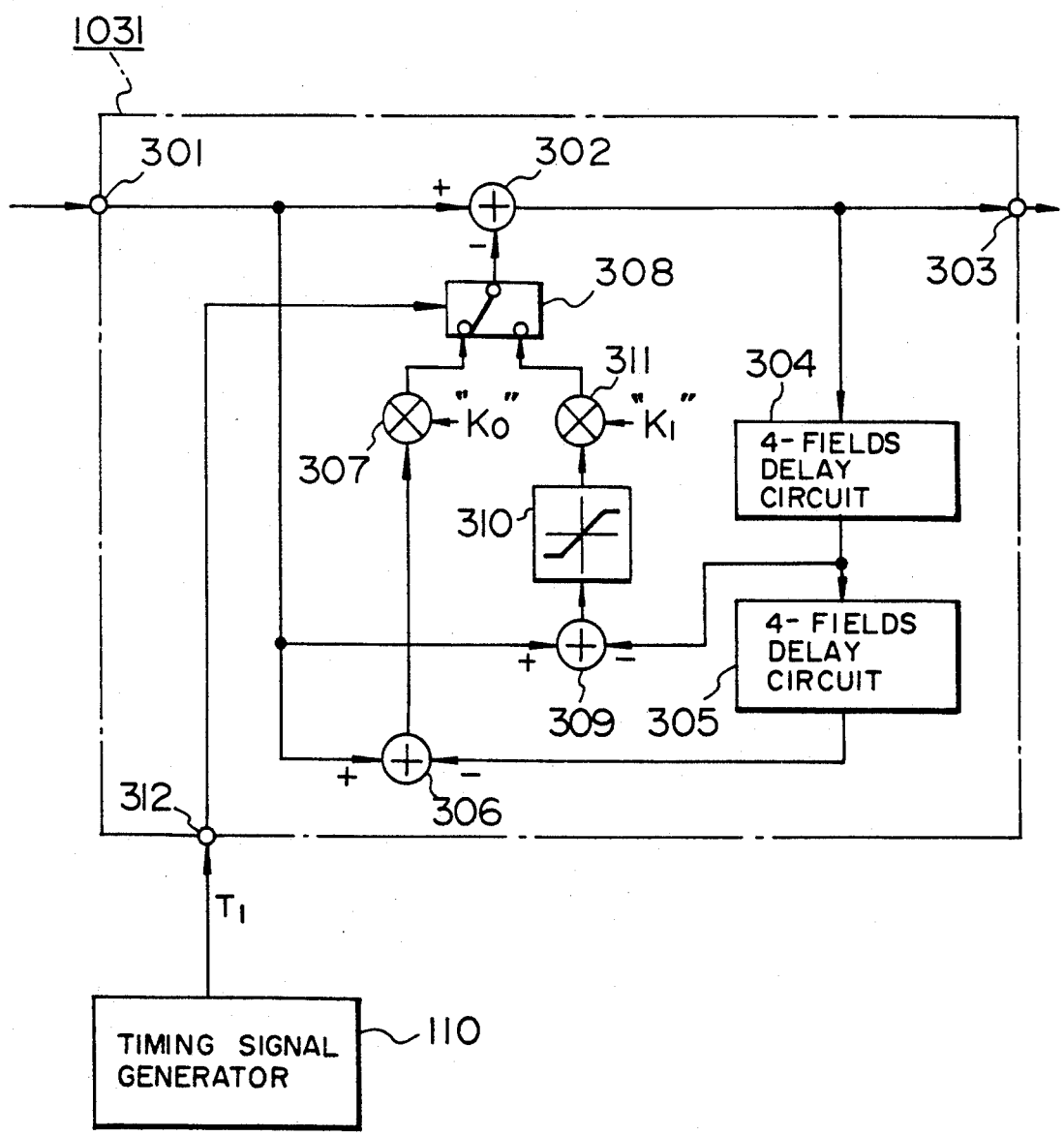
FIG. 4 is a block diagram showing another arrangement of the noise elimination filter in FIG. 2.

FIG. 4 shows another specific arrangement of the noise elimination filter used in the inventive ghost elimination device. In FIG. 4, indicated by 301 is an input terminal for the television signal, 302, 306 and 309 are subtracters, 303 is an output terminal of the television signal, 304 and 305 are 4-field delay circuits, 307 and 311 are multipliers, 308 is a switch circuit, 310 is a limiter circuit, 312 is an input terminal for the timing signal T1.

The television signal entered through the input terminal 301 is fed to one inputs of the subtracters 302, 306 and 309. The subtracter 302 implements subtraction for the television signal and the output of the switch circuit 308 received on its another input as shown by the polarities in the figure, and delivers the output to the 4-field delay circuit 304 and output terminal 303.

The 4-field delay circuit 304 delays the input signal by four fields, and delivers the resulting output to the input of another 4-field delay circuit 305 and another input of the subtracter 309. The 4-field delay circuit 305 implements a further delay of four fields for the delayed signal from the delay circuit 304 and delivers the resulting signal to another input of the subtracter 306.

Accordingly, the subtracter 306 produces a difference of signals with an interval of eight fields, and the differential signal is multiplied by a factor $K_0$ ($0 < K_0 1$) by the multiplier 307 and fed to one input of the switch circuit 308.

The subtracter 309 produces a difference of signals with an interval of four fields, and the differential signal is fed to the input of the limiter circuit 310. The limiter circuit 310 clamps the level of the differential signal to a prescribed threshold value, and delivers the signal to the multiplier 311. The multiplier 311 multiplies a factor $K_1$ ($0 < K_1 < 1$) to the input signal and delivers the output to another input of the switch circuit 308.

The switch circuit 308 responds to the timing signal T1 received on the input terminal 312 to direct the output of the multiplier 311 to the subtracter 302 at least during the period of picture signal. Accordingly, the timing signal T1 may be one similar to that of the preceding embodiment.

Since the luminance signal and chrominance signal are in-phase at points with an interval of four fields, signal components included in the differential signal are the noise and a difference of signals as a result of change in the past four fields. Generally, the former component is small in amplitude and obtained from a quiescent picture portion, while the latter component is large in amplitude and obtained from a moving picture portion.

The limiter circuit 310 operates to retard differential signals with large amplitudes, and accordingly it performs noise elimination and alleviation of persistence.

For the GCR signal, the difference of signals with an 8-field interval (produced by the delay circuits 304 and 305 in tandem) is fed to the subtracter 302, and the same noise elimination process as of the preceding embodiment is performed. In addition, the independent provision of multipliers in the noise eliminating circuitries for the GCR signal and picture signal enables the selection of optimal factors for both processes individually.

According to this embodiment, the GCR signal can be rid of noise, and the ghost elimination time can be reduced as in the previous embodiment. The embodiment also accomplishes a noise elimination processing circuit which is optimal to the picture signal processed with a shared delay circuit.

Although in this embodiment the luminance signal and chrominance signal are rendered noise elimination in the same circuitry, a possible variant is the provision of a tap for extracting a 2-field delay signal in the 4-field delay circuit 304, so that the 2-field differential signal is used to eliminate the noise in the luminance signal and the 4-field differential signal is used to eliminate the noise in the chrominance signal.

Figure 5:
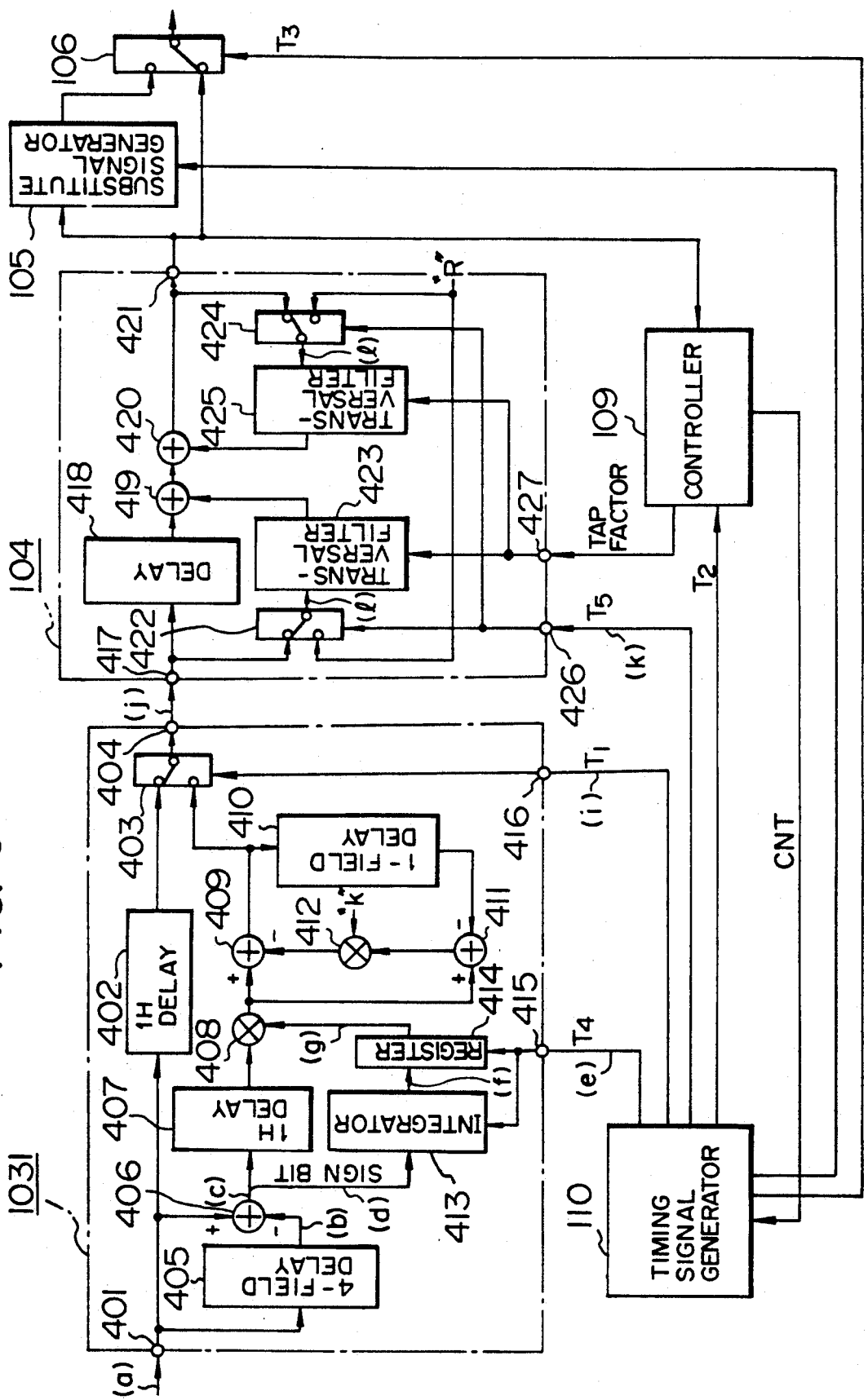
FIG. 5 is a block diagram showing the ghost elimination device based on another embodiment of this invention.

FIG. 5 shows the ghost elimination device based on another embodiment of this invention, in which indicated by 103 is a noise elimination filter and 104 is a transmission path distortion elimination filter.

In the figure, symbol 401 denotes an input terminal for introducing the television signal to the noise elimination filter 103, 402 and 407 are 1H delay circuits, 403, 422 and 424 are switch circuits, 404 is an output terminal for outputting the television signal from the noise elimination filter 103, 405 is a 4-field delay circuit, 406, 409 and 411 are subtracters, 408 and 412 are multipliers, 410 is a 1-field delay circuit, 413 is an integrator, 414 is a register, 415 is an input terminal of the timing signal T4, and 416 is an input terminal for the timing signal T1.

Indicated by 417 is an input terminal for introducing the television signal to the transmission path distortion elimination filter 104, 418 is a delay circuit for phase adjustment, 419 and 420 are adders, 421 is an output terminal for outputting the television signal from the transmission path distortion elimination filter 104, 423 and 425 are transversal filters, 426 is an input terminal for the timing signal T5, and 427 is an input terminal for tap factor data.

Figure 6:
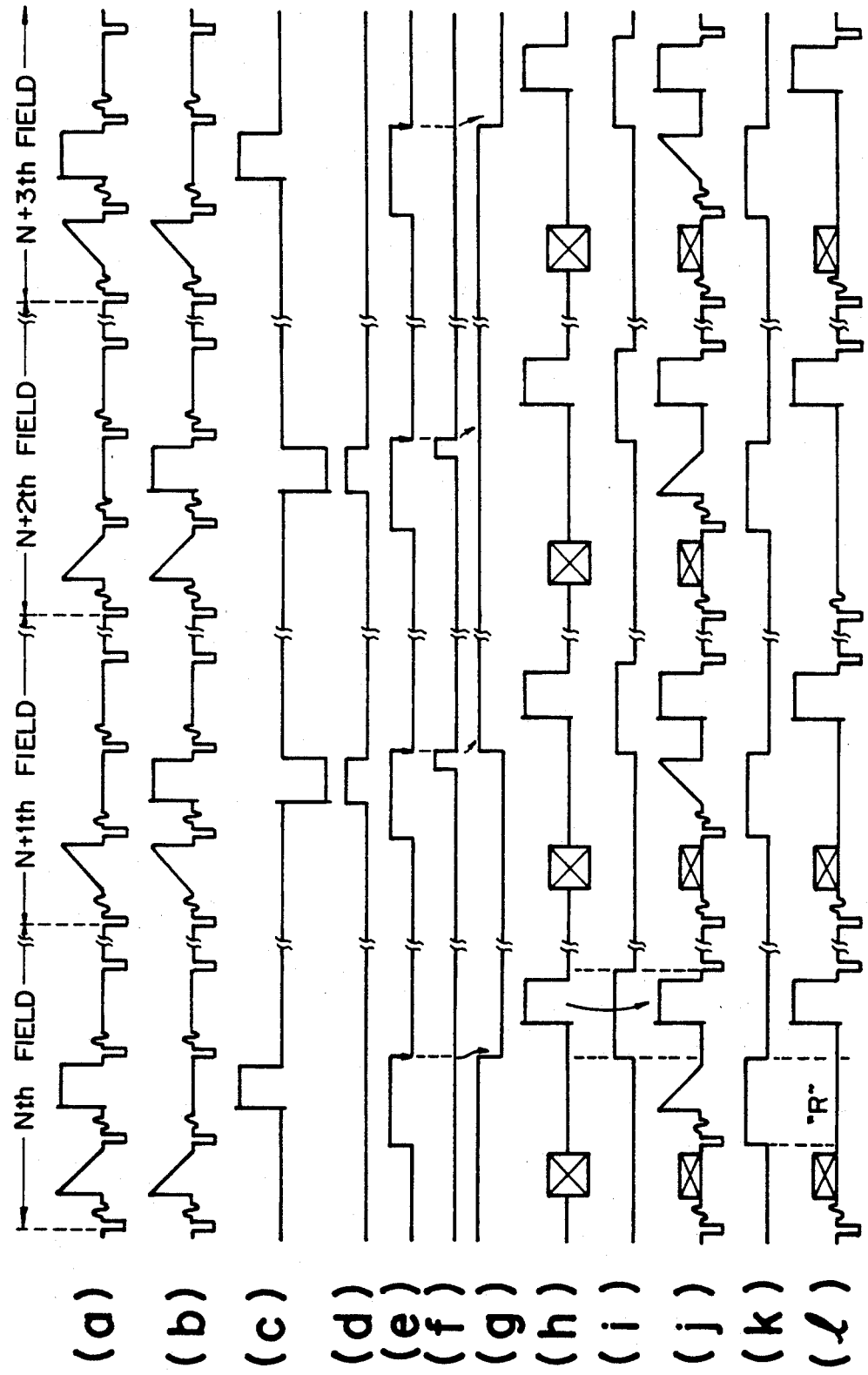
FIGS. 6 and 7 are waveform diagrams showing the major signal waveforms observed in the operation of the embodiment shown in FIG. 5.

FIG. 6 shows an example of the signal waveforms observed in the operation of the embodiment shown in FIG. 5. In the figure, shown by (a) is the television signal received on the input terminal 401, (b) is the output of the 4-field delay circuit 405, (c) is the output of the subtracter 406, (d) is a sign bit of the output of the subtracter 406, (e) is the timing signal T4, (f) is the output of the integrator 413, (g) is the output of the register 414, (h) is the output of the multiplier 408, (i) is the timing signal T1, (j) is the output of the switch circuit 403, (k) is the timing signal T5, (1) is the signal which is fed to the transversal filters 423 and 425.

The television signal shown by (a) is entered through the input terminal 401 and rendered a 1H delay by the 1H delay circuit 402, and the delayed signal is fed to one input of the switch circuit 403. The delayed television signal is also fed to the input of the 4-field delay circuit 405 and one input of the subtracter 406.

The 4-field delay circuit 405 delays the input signal by four fields, producing the output as shown by (b) in FIG. 6. This output signal is fed to another input of the subtracter 406, which then subtracts the signal (b) from the signal (a) as shown for the input polarities of subtracter 406 in FIG. 5, thereby producing a waveform in which components other than the GCR waveform are cancelled out as shown by (c) in FIG. 6. The result of subtraction is rendered a 1H delay by the 1H delay circuit 407 and fed to one input of the multiplier 408.

A bit signal carrying the sign of subtraction result is also fed to the input of the integrator 413. In the exemplified operation of FIG. 6, a signal shown by (d) which goes high (negative) during the negative section of the GCR waveform is fed to the integrator 413. The timing signal T4 produced by the timing signal generator 110 is fed through the input terminal 415 to the integrator 413 and register 414. The timing signal T4 is shown by (e) in FIG. 6.

The integrator 413 is intended to detect the polarity of the GCR waveform produced at the output of the subtracter 406, based on the frequencies of signs of the bar waveform section. Namely, a line with a negative GCR waveform will have a negative polarity at a very high probability than the other case, and events of negative polarity are counted with a counter or the like to achieve the purpose. For example, the count operation of the counter is controlled by using the timing signal T4 and the sign bit as follows.

(1) The counter keeps a reset state during the low period of the timing signal T4.
(2) The counter counts the system clock during the period of a high timing signal T4 and a negative sign bit.
(3) The counter halts counting during the period of a high timing signal T4 and a positive sign bit.
(4) The counter stops counting when the count exceeds a certain value and issues a flag of count stop to the register 414. For example, when sampling takes place at a frequency four times the color subcarrier frequency, the number of samples in the 1H period is 910 and in this case the bar GCR waveform section includes about 640 samples, and the above-mentioned certain value is chosen to be 512 for example.

For the integrator 413, it is also possible to apply a generally known random walk filter or N-before-M filter.

In consequence, the count stop flag is produced as shown by (f) in FIG. 6, which is introduced to the register 414 in response to the falling edge of the timing signal T4 shown by (g) for example, and it is fed to another input of the multiplier 408.

The multiplier 408 implements multiplication for the integrated sign (i.e., a multiplier of 1 for the positive sign or −1 for the negative sign) and the output of the subtracter 406 to produce a GCR waveform with the same polarity for every field a shown by (h) in FIG. 6. In case the sign is used intact, the multiplier 408 can be a simple arrangement including an exclusive-OR gate.

The output of the multiplier 408 is connected to one inputs of the subtracters 409 and 411. The subtracter 409 has its output connected to another input of the switch circuit 403 and the input of the 1-field delay circuit 410, which delays the input signal by one field and delivers the result to another input of the subtracter 411.

The output of the subtracter 411 is multiplied by the factor K by the multiplier 412, and the result is fed to another input of the subtracter 409. Since the multiplier 408 provides on its output the GCR waveform in every field, the subtracter 411 which evaluates the 1-field difference of GCR waveform provides noise components without correlation, and a GCR waveform with the noise being removed is produced on the output of the subtracter 409.

The switch circuit 403 receives on its control input the timing signal T1 which is produced by the timing signal generator 110 and entered through the input terminal 416. The timing signal T1 has a timing relation as shown by (i) in FIG. 6, and it controls the switch circuit 403 so that the noise-eliminated GCR signal is superimposed on the original signal as shown by (j) in FIG. 6. The resulting signal is delivered through the output terminal 404 and then through the input terminal 417 of the transmission path distortion elimination filter 104 to the input of the delay circuit 418 and one input of the switch circuit 422.

The adder 419 has its one input connected to the output of the delay circuit 418 and another input connected to the output of the transversal filter 423, and its output is connected to one input of the adder 420. The adder 420 has another input connected to the output of another transversal filter 425, the output of which is connected to the output terminal 421 and one input of the switch circuit 424.

The switch circuits 422 and 424 receive a fixed value R on their another inputs, and receive on their control inputs a timing signal T5 produced by the timing signal generator 110 through the input terminal 427. The output of the switch circuit 422 is connected to the input of the transversal filter 423, while the output of the switch circuit 424 is connected to the input of the transversal filter 425, with both transversal filters being given tap factors provided by the controller 109 through the input terminal 427.

It is known that the delay time of ghost created by the distortion of transmission path ranges from −2 $\mu$s to 40 $\mu$s approximately. The television signal of NTSC system has a horizontal scanning period of about 63.5 $\mu$s, and if distortions of long delay time exist, distortions in one horizontal scanning period are the mixture of those caused by the delay of the signal on the current line and those caused by the delay of the signal on the previous line.

The transversal filters 423 and 425 have tapped delay lines to cover distortions of this range and produce distortion elimination signals by delaying their input signals. On this account, the tapped delay line always carries signals earlier by 40 $\mu$m or more appropriately with respect to the current signal.

The noise elimination filter 103 of this embodiment operates to insert the GCR waveform, which has been rendered the field sequence decoding, in the original television signal. In the decoding computation of the transmission sequence, the reference signal for ghost elimination is obtained in every field and, at the same time, the GCR signal is rid of distortions caused by the mixing of the signal of 1H advancement and the horizontal sync signal.

Accordingly, if the signal of previous line of multiplexed GCR signal is entered intact to the transversal filters 423 and 425, these filters operate to produce a signal which cancels the eliminated distortion signal. The distortion to be eliminated by the elimination signal is already rid of the multiplexed GCR waveform, and therefore addition of this signal results adversely in the appendage of a distortion, which will incur erroneous detection of distortion by the controller 109.

To cope with this situation, the timing signal T5 is used to control the switch circuits 422 and 424 so that a fixed value R is fed to the inputs of the transversal filters 423 and 425 at the previous line of GCR waveform in the timing relationship shown by (k) in FIG. 6. Consequently, the transversal filters 423 and 425 are given the signal shown by (1) in FIG. 6, and the filters can provide the distortion elimination signal for eliminating the distortion included in the GCR waveform without the influence of the previous line.

In conclusion, according to this embodiment, the GCR waveform which has been rendered the field sequence process is rid of noise, and the delay line needed for noise elimination can be reduced from eight fields to one field and the time constant can be reduced to ⅛ of the preceding embodiment.

The controller 109, which is given the field sequence processed GCR waveform, can implement the distortion detection and tap factor correction in every field, and the time needed for the iterative operations can be reduced to 1/5 of the preceding embodiment. For example, the processing time t2' expended in the 60 eliminating operations for the s/n improvement by 20 dB is calculated approximately as follows.

$$t2' = 1/ln(0.98) \times 1/60 + 60 \times 1/60 = 1.8 \text{ sec}$$

This processing time is about 1/5 of the case of the preceding embodiment.

Moreover, the delay line used for the noise elimination filter 103 can be reduced from eight fields to five fields, and it provides the effectiveness of circuit scale reduction.

In case the GCR waveform which has been rendered the field sequence process and noise elimination process does not need to be inserted back to the original line, the 1H delay circuit 402 can be removed and the circuit scale can further be reduced. By manipulating the delay time of the 1H delay circuit 402 in a multiple of 1H, the line where the GCR waveform is inserted back can be chosen arbitrarily.

The noise elimination filter 103 of this embodiment only deals with the GCR signal, and through the time division operation of the 4-field delay circuit 504 and 1-field delay circuit 410, it can be configured with the memory capacity for storing only the line of GCR signal, and the circuit scale can further be reduced.

Furthermore, the transmission path distortion elimination filter 104 of this embodiment can be used in combination with the noise elimination filter of the preceding embodiment, and in this case based on the above-mentioned reason, the scale of the 8-field delay circuit 207 of the noise elimination filter 103 of the embodiment of FIG. 3 can be reduced, or the scale of the 4-field delay circuit 305 of the noise elimination filter 103 of the embodiment of FIG. 4 can be reduced.

Although in this embodiment the sync signal and color burst of a line are lost when the GCR waveform is inserted back to the line, this situation can be overcome by using the substitute signal generator 105, as will be explained with reference to FIG. 7 in the following.

Figure 7:
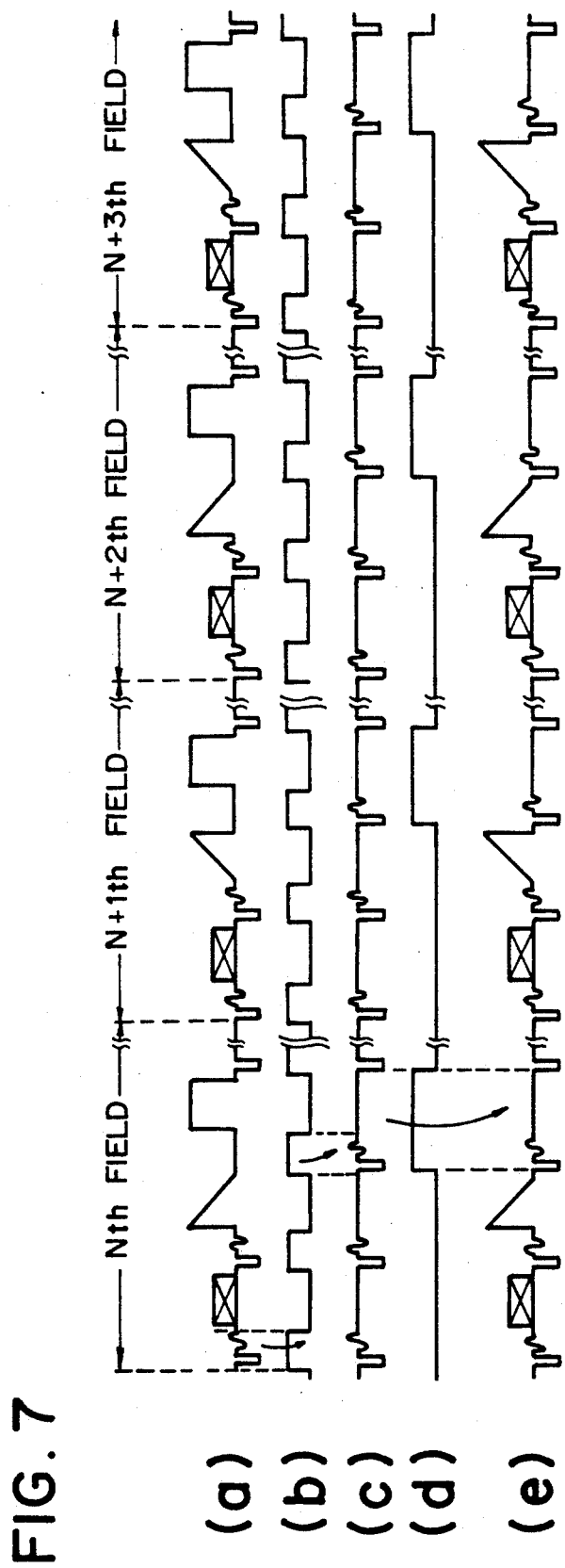

FIG. 7 shows an example of waveforms, in which shown by (a) is the television signal outputted from the transmission path distortion elimination filter 104, (b) is the gate pulse produced by the timing signal generator 110 and fed to the substitute signal generator 105, (c) is the output of the substitute signal generator 105, (d) is the timing signal T3 fed to the control input of the switch circuit 106, and (e) is the output of the switch circuit 106.

The substitute signal generator 105 is formed of a delay circuit having a certain delay time, and it is controlled to operate during the high period of the gate pulse and hold the output during the low period. Based on this circuit arrangement, the substitute signal generator 105 operates to delay the signal as shown by (c) in FIG. 7 at least during the period when the sync signal and color burst overlap, and hold the value immediately before the transition of the gate pulse from high to low as shown by (b).

The timing signal T3 produced by the timing signal generator 110 controls the switch circuit 106 in the timing relation shown by (d) in FIG. 7, thereby exchanging the inserted-back GCR signal and the output of the substitute signal generator 105. In this case, by choosing the delay time of the substitute signal generator 105 to be a multiple of 2H, the inserted-back GCR waveform is cancelled and at the same time the sync signal and continuous color burst can be restored as shown by (e) in FIG. 7.

It is apparent from FIG. 7 that the foregoing operation can be halted for the prevention of malfunctioning of the rear-stage ghost elimination device, and it can be applied to the preceding embodiment.

Next, a means of making the rear-stage ghost elimination device operative based on this embodiment will be explained. The controller 109 has the ability for the judgement of condition of the termination of fast operation mode as in the preceding embodiment. At the end of the fast operation based on the judgement condition, the control signal CNT is used to control the timing signals T1, T3 and T5 generated by the timing signal generator 110 so that the switch circuit 403 always selects the output of the 1H delay circuit 402, the switch circuit 106 always selects the output of the transmission path distortion elimination filter 104, the switch circuit 422 always selects the input on the input terminal 417, and the switch circuit 424 always selects the output of the the adder 420.

Consequently, the insertion process for the GCR signal which has been rendered the field sequence process and noise elimination process and the sync signal restoration process by the substitute signal generator 105 are suspended, and the original GCR signal is delivered to the output of the switch circuit 106 so that the rear-stage ghost elimination device is made operative. The GCR signal fed to the controller 109 is switched to the signal which has not been processed by the noise elimination filter 103. If it is intended to continue the distortion elimination process even after the termination of the fast operation, it is made possible through the addition of such processes as noise elimination based on the conventional synchronous addition and 8-field sequence computation following the judgement of termination of the fast operation. After the termination of fast operation, the residual distortion is suppressed sufficiently, and therefore the distortion elimination process can be switched to that of the conventional method, which takes longer time for the iterative operations, without problems.

In case the GCR signal is to be inserted back to a line different from the line with the insertion of the original GCR signal, it is made possible by modifying the timing signal T3 so that the GCR signal is replaced with the output of the substitute signal generator 105 for both lines.

In this embodiment, a fixed value R is inserted to the previous line at the input of the transversal filter in order to process the inserted-back GCR signal correctly. On this account, the signal on the previous line is not rid of distortion during the fast operation, and on the line next to the inserted GCR signal, the distortion elimination signal produced by this GCR signal is mixed in. The influence on the lines preceding and following the GCR signal insertion does not impose a problem because of the fast operation and very short-time process in this embodiment. If such influence cannot be neglected, it can be overcome by expanding the timing signal T3 to 3H before and after the insertion and replacing the GCR signal with the signal from the substitute signal generator 105.

Figure 8:
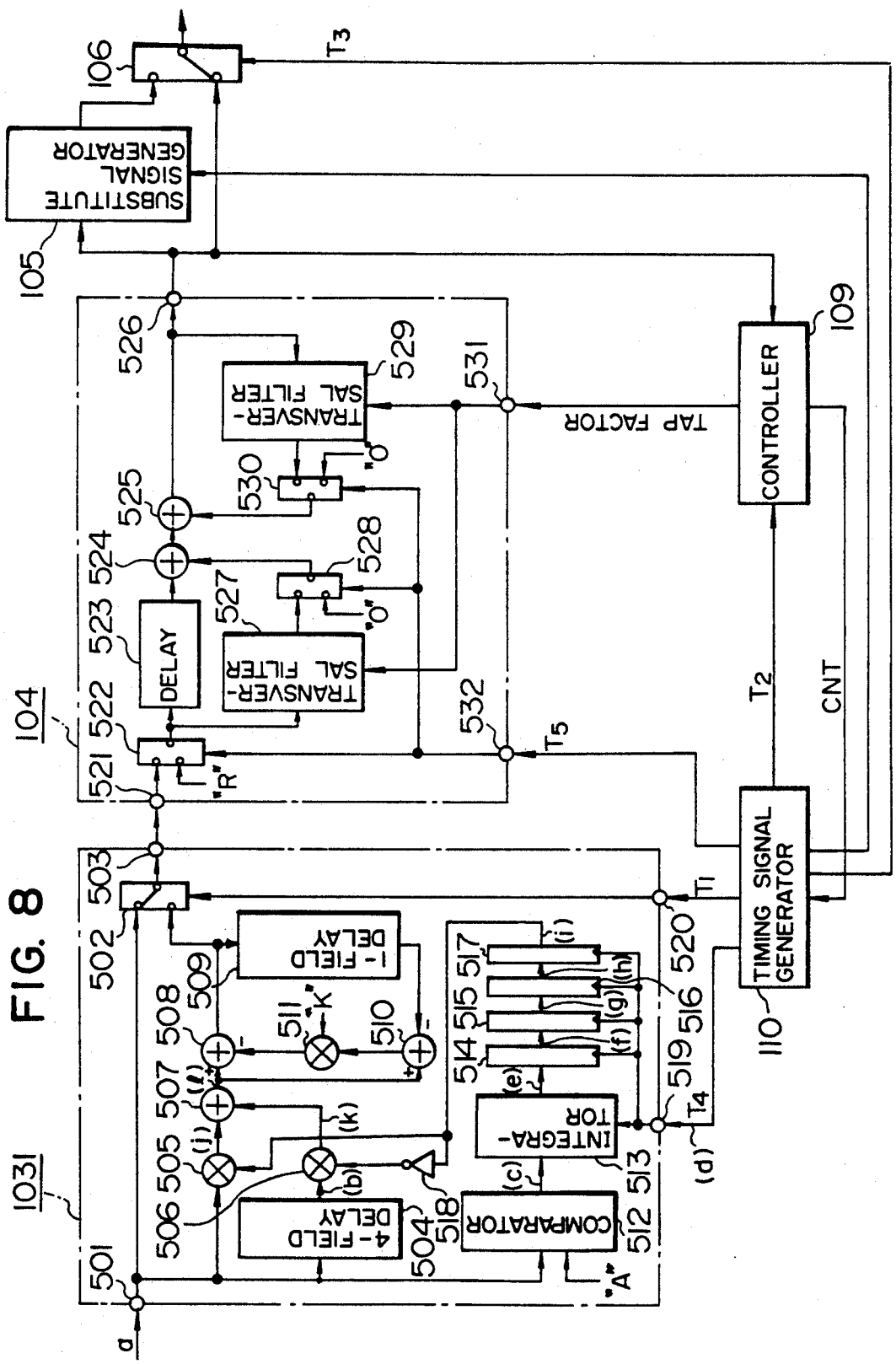
FIG. 8 is a block diagram showing the ghost elimination device based on still another embodiment of this invention.

FIG. 8 shows the ghost elimination device based on still another embodiment of this invention.

In the figure, indicated by 501 is an input terminal for entering the television signal to the noise elimination filter 103, 502, 522, 528 and 530 are switch circuits, 503 is an output terminal for delivering the television signal from the noise elimination filter 103, 504 is a 4-field delay circuit, 505, 506 and 511 are multipliers, 507, 524 and 525 are adders, 508 and 510 are subtracters, 509 is a 1-field delay circuit, 512 is a comparator, 513 is an integrator, 514–517 are registers, 518 is an inverter, 519 is an input terminal for the timing signal T4, and 520 is an input terminal for the timing signal T1.

Further indicated by 521 is an input terminal for entering the television signal to the transmission path distortion elimination filter 104, 523 is a delay circuit, 526 is an output terminal for delivering the television signal from the transmission path distortion elimination filter 104, 527 and 529 are transversal filters, 531 is an input terminal for the tap factor data, and 532 is an input terminal for the timing signal T5.

Figure 9:
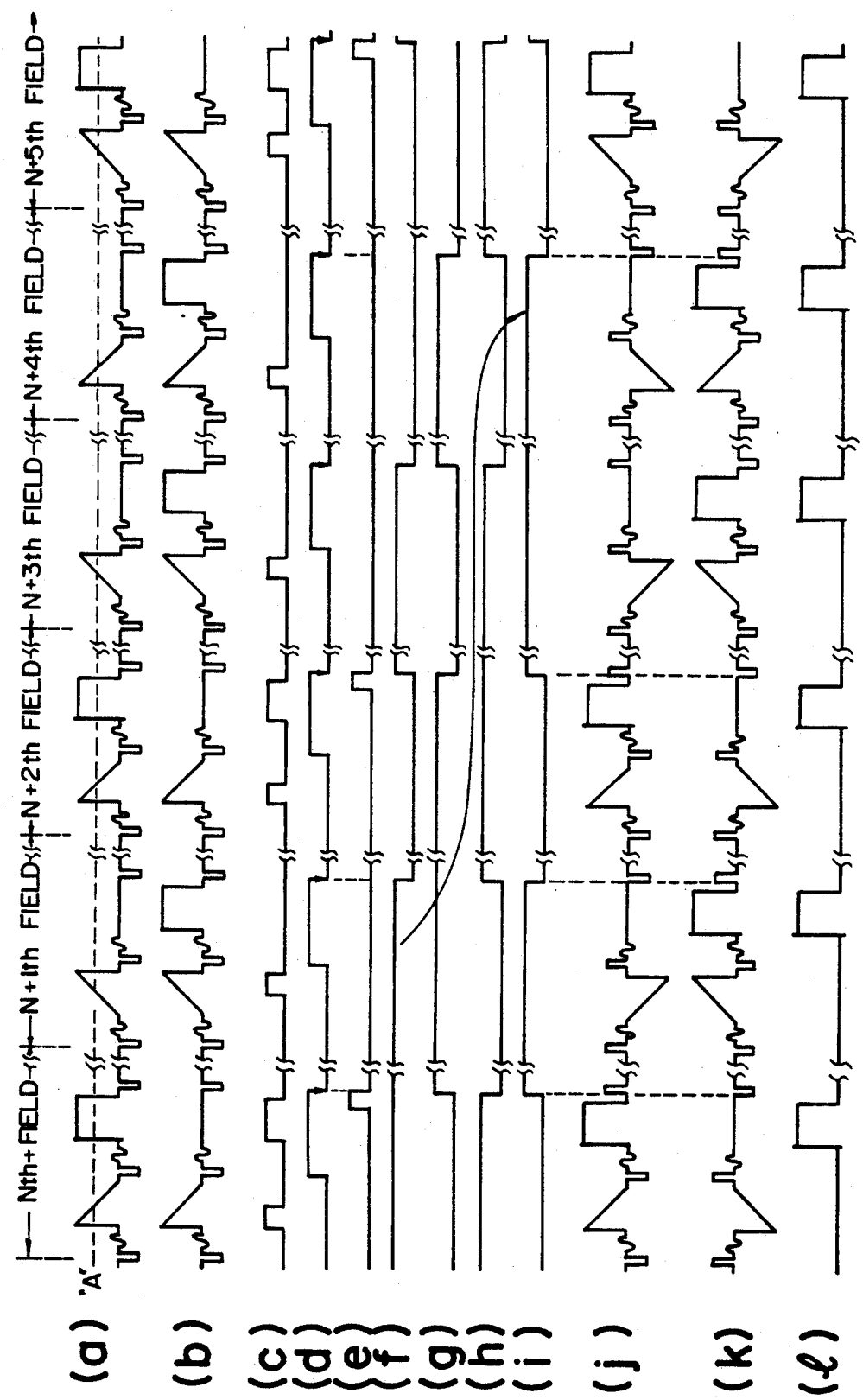
FIGS. 9 and 10 are waveform diagrams showing the major signal waveforms observed in the operation of the embodiment shown in FIG. 6.
Figure 10:
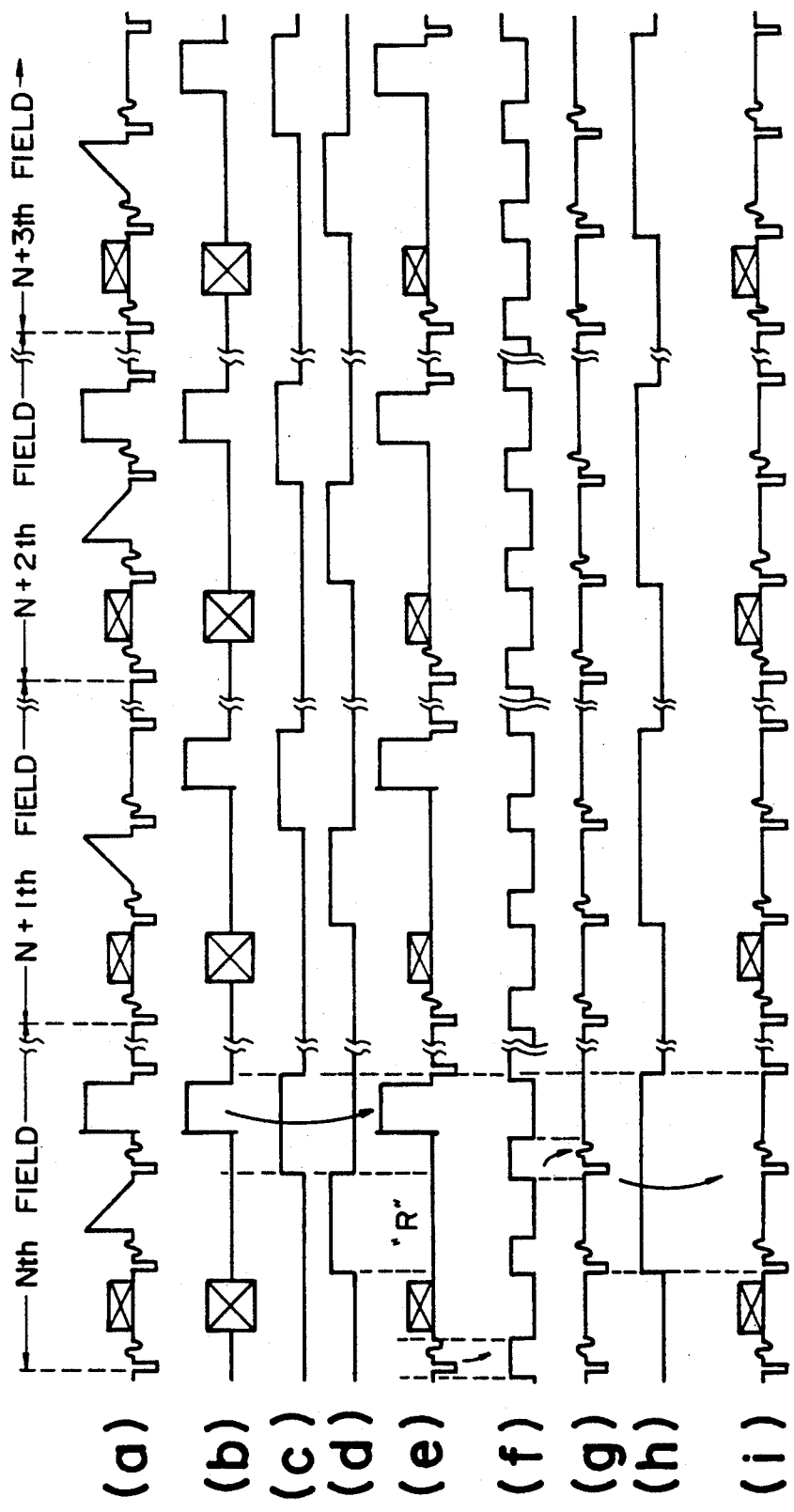

FIGS. 9 and 10 show, as an example, the operational waveforms of this embodiment.

In FIG. 9, shown by (a) is the television signal entered through the input terminal 501, (b) is the output of the 4-field delay circuit 504, (c) is the output of the comparator 512, (d) is the timing signal T4, (e) is the output of the integrator 513, (f) is the output of the register 514, (g) is the output of the register 515, (h) is the output of the register 516, (i) is the output of the register 517, (j) is the output of the multiplier 505, (k) is the output of the multiplier 506, and (l) is the output of the adder 507.

In FIG. 10, shown by (a) is the television signal entered through the input terminal 501, (b) is the output of the adder 508, (c) is the timing signal T1, (d) is the timing signal T5, (e) is the output of the switch circuit 522, (f) is the gate pulse produced by the timing signal generator 110 and fed to the substitute signal generator 105, (g) is the output of the substitute signal generator 105, (h) is the timing signal T3 fed to the control input of the switch circuit 106, and (i) is the output of the switch circuit 106.

The timing signal shown by (a) in FIG. 9 is entered through the input terminal 501 and fed to one input of the switch circuit 502. The television signal is also fed to one input of the multiplier 505, the input of the 4-field delay line 504 and one input of the comparator 512.

The 4-field delay circuit 504 delays its input signal by four fields to produce a signal as shown by (b) in FIG. 9, and it is fed to one input of the multiplier 506. The comparator 512 compares the television signal with the threshold value A received on its another input thereby to produce a bi-level signal as shown by (c) in FIG. 9, and it is fed to the input of the integrator 513.

The timing signal T4, as shown by (d) in FIG. 9, produced by the timing signal generator 110 is delivered through the input terminal 519 to the integrator 513 and registers 514–517.

The integrator 513 detects as to whether the GCR signal entered to the 4-field delay circuit 504 is a bar signal or pedestal signal, based on the frequency of signals that exceed the threshold value A on the GCR signal multiplexed (inserted) line. For example, with the threshold value A being set to half the bar signal level as shown by (a) in FIG. 9, the probability of the occurrence of the value indicated by the bi-level signal becomes opposite between the case of the multiplexed pedestal signal and the case of the multiplexed bar signal. Accordingly, by counting events of signals in excess of the threshold value A for example, the input signal can be distinguished. The detection is accomplished by a similar means as for the integration of sign in the preceding embodiment by using the output of the comparator 512 and the timing signal T4.

In consequence, the integrator 513 produces an output as shown by (e) in FIG. 9. The integration result is latched in the register 514 in response to the falling edge of the timing signal T4, for example, and it is outputted as shown by (f) in FIG. 9. The output of the register 514 is delayed by the registers 515–517 in multiples of one field by being timed by the timing signal T4 as shown by (g), (h) and (i) in FIG. 9, and it is fed to another input of the multiplier 505 and, through the inverter 518, to another input of the multiplier 506. As a result, the result of integration of the signal produced by the 4-field delay circuit 504 is fed to the multipliers 505 and 506 at the same time.

The multiplier 505 implements multiplication with the integration result and produces a signal in which fields with the insertion of the pedestal signal are inverted as shown by (j) in FIG. 9. The multiplier 506 implements multiplication with the inverted version of the integration result and produces a signal in which fields with the insertion of the pedestal signal are inverted as shown by (k) in FIG. 9. The outputs of the multipliers 505 and 506 are summed by the adder 507, and it produces GCR waveforms with the same polarity in all fields.

The multipliers 505 and 506 operate with a factor of $-1$ or $+1$ in response to a high level or low level of the integration result, with the inverter 518 being given the opposite factor. In case the logical output of the integration result is used intact, the multipliers 505 and 506 can be formed in a simple configuration using exclusive-OR gates, and the inverter 518 can be a simple NOT gate.

The output of the adder 507 is connected to one inputs of the subtracters 508 and 510. The subtracter 508 has its output connected to another input of the switch circuit 502 and the input of the 1-field delay circuit 509. The 1-field delay circuit 509 delays its input signal by one field and delivers the output to another input of the subtracter 510. The subtracter 510 has its output multiplied by the factor K by the multiplier 511, and the result is fed to another input of the subtracter 508.

Since the adder 507 produces a GCR signal in every field, the subtracter 510 which evaluates the difference between contiguous fields produces noise components without correlation, and the subtracter 508 produces the GCR signal which has been rid of noise.

The switch circuit 502 receives the signal shown by (a) in FIG. 10 on the input terminal 501 and the signal shown by (b) which has been rendered the field sequence process and noise elimination process. Received on its control input is the timing signal T1 provided by the timing signal generator 110 through the input terminal 520, and the signal controls the switching operation. The output of the switch circuit 502 is fed to one input of the switch circuit 522 by way of the output terminal 503 of the noise elimination filter 103 and the input terminal 521 of the transmission path distortion elimination filter 104. The switch circuit 522 receives a fixed value R on its another input and receives on its control input the timing signal T5 provided by the the timing signal generator 110 through the input terminal 532, and the switching operation is controlled by the signal T5.

The timing signals T1 and T5 have a timing relationship as shown by (c) and (d) in FIG. 10. On the switch circuit 502, the GCR signal which has been rendered the field sequence process and noise elimination process is multiplexed with the television signal on the input terminal 501, and on the switch circuit 522, the fixed value R is superimposed on the television signal, as shown by (e) in FIG. 10.

In consequence, the GCR signal, which has been rendered the field sequence process and noise elimination process, and the signal, which has been rendered the process for preventing the mixing of distortion from the previous line, are multiplexed as a signal.

This television signal is fed to the inputs of the delay circuit 523 and transversal filter 527. The adder 524 has its one input connected to the output of the delay circuit 523 and another input connected to the output of the switch circuit 528.

The switch circuit has its one input connected to the output of the transversal filter 527, and another input fixed to zero. The adder 525 has its one input connected to the output of the the adder 524 and another input connected to the output of the switch circuit 530. The switch circuit 530 has its one input connected to the output of the transversal filter 529 and another input fixed to zero.

The output of the adder 525 is connected to the output terminal 526 and the input of the transversal filter 529. The switch circuits 528 and 529 have their control inputs connected to the timing signal T5 so that the circuits produce zero during the period when the switch circuit 522 produces the fixed value R. The transversal filters 527 and 529 are given tap factors provided by the controller 109 by way of the input terminal 531.

Consequently, the transversal filters 527 and 529 produce zero during the period of the input of the fixed value R which has been inserted to the previous line of the inserted-back GCR signal, allowing the fixed value R to be fed intact to the input of the transversal filter 529, and the distortion elimination signals of the inserted-back GCR signal can be obtained from the transversal filters 527 and 529 without the influence of the previous line.

It is concluded from the foregoing that this embodiment is also capable of controlling the transmission path distortion elimination by using the noise-removed GCR signal after the field sequence process. Accordingly, the noise elimination delay line can be reduced from eight fields to one field and the controller 109 can be supplied with the GCR signal in every field, whereby the noise elimination filter can have a shorter time constant, thereby reducing the time of iterative processes, as in the preceding embodiment. The sign discrimination in the field sequence process is based on the input signal, and therefore the 1H delay circuit in the preceding embodiment can be removed, and further reduction of circuit scale can be accomplished.

If it is intended to insert the GCR signal back to another line in this embodiment, it is made possible through the provision of a delay line on the path between the input terminal 501 and switch circuit 502 or on the path between the subtracter 508 and switch circuit 502.

Also in this embodiment, as in the preceding embodiment, the memory capacity can be reduced by operating the 4-field delay line 504 and 1-field delay line 509 on a time division basis.

In the operation of this embodiment, the television signal delivered from the output terminal 526 of the transmission path distortion elimination filter 104 has its sync signal and color burst missing over two lines as shown by (e) in FIG. 10. This deficiency can be supplemented by use of the output of the substitute signal generator 105, as in the preceding embodiment. Specifically, the gate pulse from the timing signal generator 110 shown by (f) in FIG. 10 is supplied to the substitute signal generator 105 which operates identically to the preceding embodiment so that the signal in the period in which the sync signal and color burst are multiplexed is delayed by a multiple of 2H thereby to have a signal as shown by (g) in FIG. 10, and the timing signal T3 is supplied to the switch circuit 106 so that it selects the inserted-back GCR signal and, in the period of previous line, the output of the substitute signal generator 105, as shown by (h) in FIG. 10. Consequently, the switch circuit 106 provides a signal in which the sync signal and color burst in continuity are supplemented as shown by (i) in FIG. 10.

As a result of this treatment, the prevention of malfunctioning of the posst-stage ghost elimination device in its fast elimination operation can be accomplished at the same time, and the transmission of GCR signal following the fast elimination operation is made possible in the same manner as the preceding embodiment.

Furthermore, the process of the case of inserting back the GCR signal to a line different from the original GCR signal multiplexed line is made possible in the same manner as the preceding embodiment.

It is also possible to change the combination of the noise elimination filter 103 and transmission path distortion elimination filter 104 in this embodiment and preceding embodiment, and in this case, the substitute signal generator 105 operates to match the operation of the transmission path distortion elimination filter 104.

Figure 11:
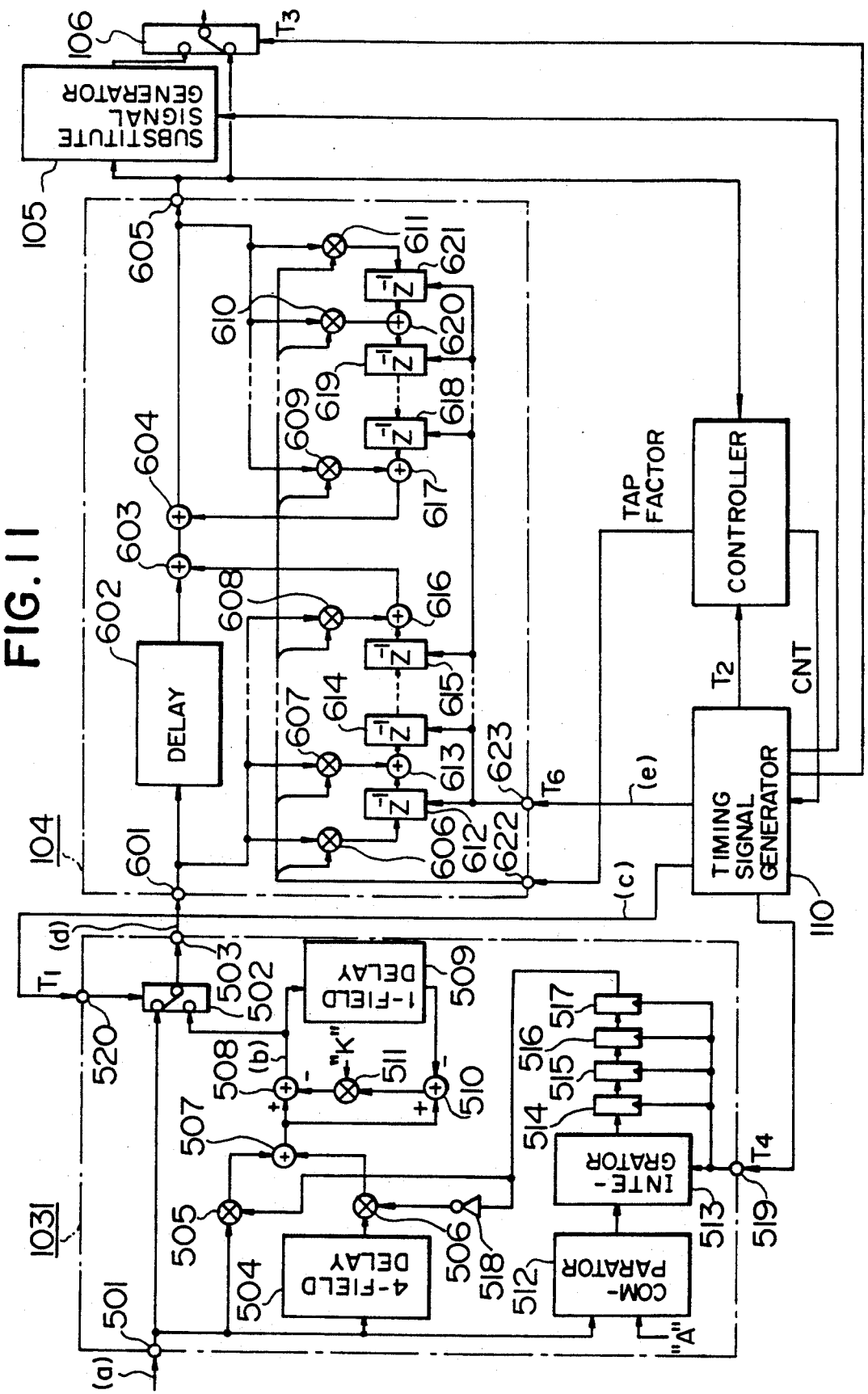
FIG. 11 is a block diagram showing the ghost elimination device based on still another embodiment of this invention.

FIG. 11 shows the ghost elimination device based on still another embodiment of this invention.

In the figure, indicated by 601 is an input terminal of the transmission path distortion elimination filter 104, 602 is a delay circuit, 603 and 604 are adders, 605 is an output terminal of the transmission path distortion elimination filter, 606–608 are multipliers which constitute a first transversal filter, 609–611 are multipliers which constitute a second transversal filter, 612–615 are registers which constitute the first transversal filter, and 618–621 are registers which constitute tapped delay lines of the second transversal filter.

Further indicated by 613 and 616 are adders which constitute the first transversal filter, 617 and 620 are adders which constitute the second transversal filter, 622 is an input terminal for tap factor data, 623 is an input terminal for the timing signal T6, and the remaining reference numerals are identical to the preceding embodiments.

Figure 12:
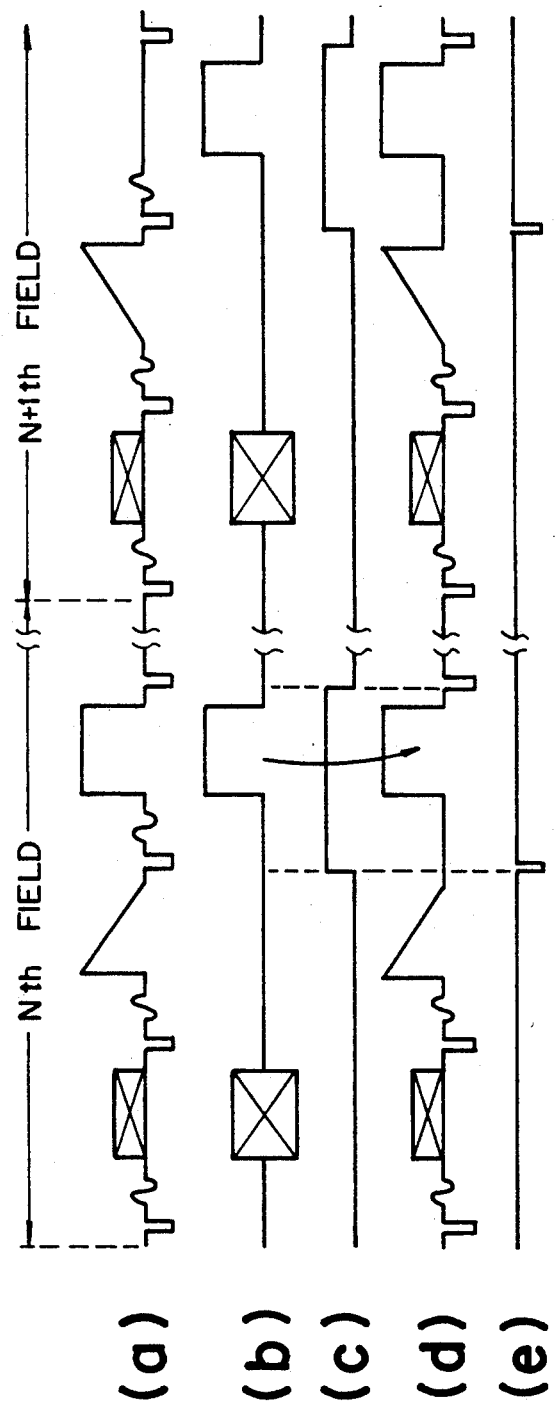
FIG. 12 is a waveform diagram showing the major signal waveforms observed in the operation of the embodiment shown in FIG. 11.

FIG. 12 shows an example of operational waveforms of this embodiment. In the figure, shown by (a) is the television signal received on the input terminal 501 of the noise elimination filter 103, (b) is the output of the adder 508, (c) in the timing signal T1, (d) is the output of the noise elimination filter 103 delivered through the output terminal 503, and (e) is the timing signal T6.

The noise elimination filter 103 is supplied on its input terminal 501 with the television signal shown by (a) in FIG. 12, and the signal is rendered the field sequence process and thereafter the noise elimination process, as in the preceding embodiments. Consequently, the signal shown by (b) in FIG. 12 is produced on the output of the adder 508, and it is fed to the switch circuit 502. In response to the timing signal T1 shown by (c) in FIG. 12, the switch circuit 502 inserts the processed GCR signal to the signal which is received on the input terminal 501.

The resultant signal shown by (d) in FIG. 12 is entered through the input terminal 601 of the transmission path distortion elimination filter 104 and fed to the input of the the delay circuit 602 and one inputs of the multipliers 606–608 of M in number which constitute the first transversal filter with M taps. These multipliers have another inputs given tap factors supplied from the controller 109 through the input terminal 622.

The tapped delay lines of the first transversal filter made up of registers 612–615 of M-1 in number operate to delay their inputs by one sample and deliver the results to one inputs of the corresponding adders 613–616 of M-1 in number, so that the outputs of the multipliers 607 and 608 received on their another inputs are summed cumulatively, and the result of summation is fed to one input of the adder 603.

The adder 603 has another input receiving the signal on the input terminal 601 through the delay circuit 602. The delay circuit 602 is intended to make in-phase with the output of the the first transversal filter fed to the one input of the adder 603, and, assuming that the center tap of the transversal filter is the Mth tap, it implements a delay of M sampling periods.

As a consequence of the above process, a distortion elimination signal for cancelling out the distortion which has been created in samples earlier than M samples or more with respect to the current sample is provided by the first transversal filter, and the adder 603 provides on its output the signal, with the distortion in this range being suppressed, which is fed to one input of the adder 604.

The output of the adder 604 is delivered to the output terminal 605 of the transmission path distortion elimination filter 104 and to one inputs of multipliers 609–611 of L in number which constitute the second transversal filter with L taps. These multipliers have another inputs given tap factors provided by the controller 109.

The tapped delay lines of the second transversal filter made up of L-1 registers 618–621 delay their inputs by one sample, and provide the results to one inputs of the corresponding adders 617–620 of L-1 in number, so that the outputs of the multipliers 609 and 610 received on their another inputs are summed cumulatively, and the result of summation is fed to one input of the adder 604.

As a consequence of the above process, a distortion elimination signal for cancelling out the distortion which has been created in up to the successive Lth sample with respect to the current signal is provided by the second transversal filter, and the adder 604 provides on its output the signal, with the distortion in this range being suppressed, which is delivered through the output terminal 605.

The registers 612–615 and registers 618–621 which constitute the tapped delay lines of the first and second transversal filters, respectively, have terminals for initialization, on which are applied the timing signal T6 provided by the timing signal generator 110 through the input terminal 623. The timing signal T6 goes low for one sampling period by being timed to the entry of the first sampled value of the inserted-back GCR signal to the transmission path distortion elimination filter 104, as shown by (e) in FIG. 12, and the delay line registers are all initialized for their contents by the low-level timing signal T6.

In consequence, signals of the previous line stored in these registers are replaced with the initial values, and the successive inserted-back GCR signal can be processed without the influence of the distortion elimination signal produced from the signal of the previous line.

Accordingly, the transmission path distortion elimination filter 104 of this embodiment is also capable of processing correctly the GCR signal which has been processed by the noise elimination filter 103 and supplying it to the controller 109, whereby the ghost elimination time can be reduced.

This embodiment can also eliminate the distortion of the previous line based on its ability of removing the distortion elimination signal which is produced from the signal of the previous line immediately before the entry of the inserted-back GCR signal.

Moreover, the transmission path distortion elimination filter 104 of this embodiment can be used in combination with the noise elimination filter 103 of the preceding embodiment.

Although the inventive ghost elimination device has been explained for the reference signal of transmission path distortion elimination shown in FIG. 13, the reference signal waveform is not confined to this example, but an arbitrary fixed pattern signal can be used. The invention is also applicable to the case of a reference signal having other field sequence through the process which matches the sequence, or to the case of a reference signal without field sequence through the removal of the sequence processing block.

Figure 14:
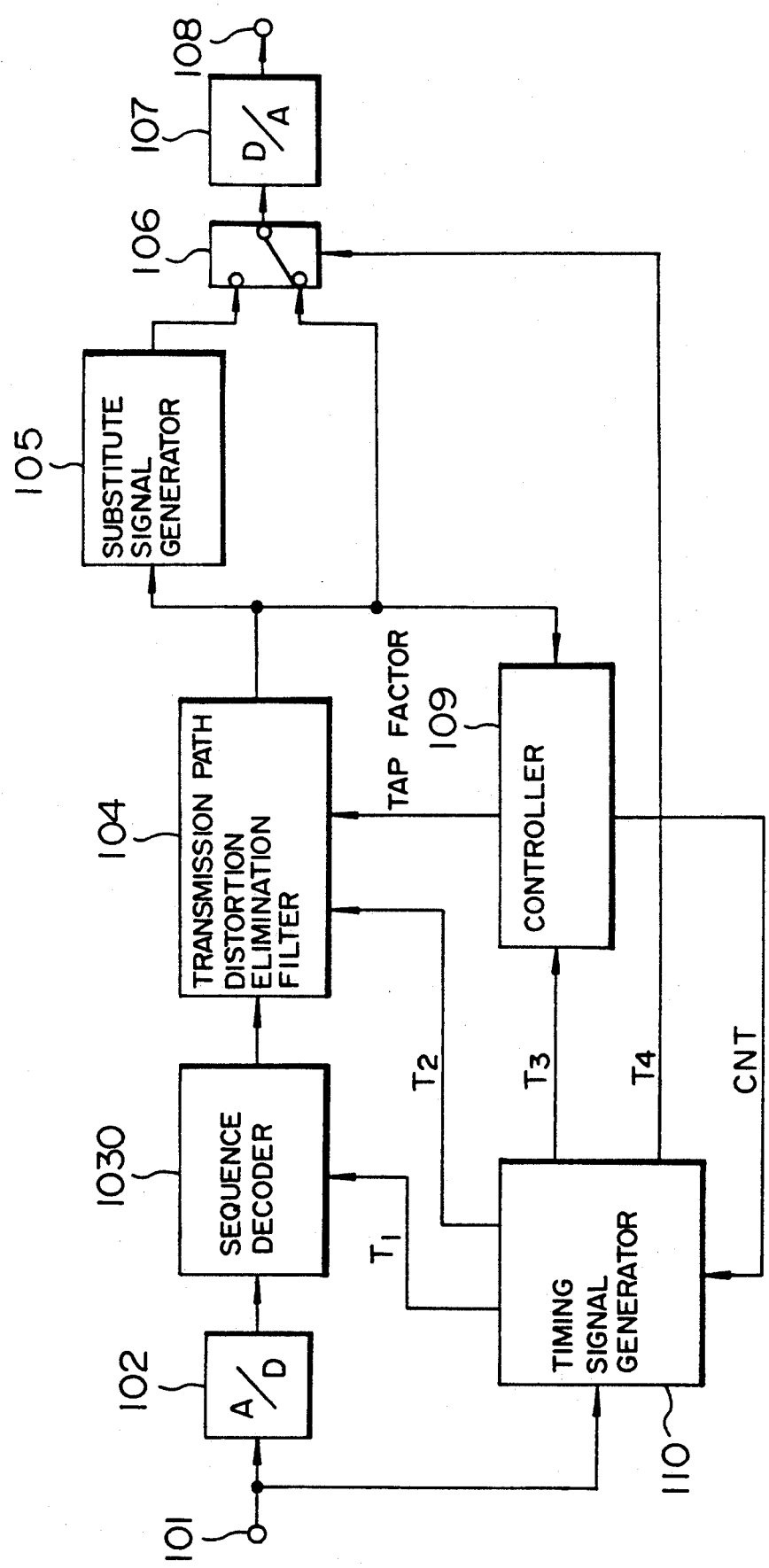
FIG. 14 is a block diagram showing the ghost elimination device based on still another embodiment of this invention.

FIG. 14 is a block diagram showing the ghost elimination device based on still another embodiment of this invention. In the figure, indicated by 101 is an input terminal for the television signal, 102 is an alanog-to-digital converter (A/D converter), 1030 is a sequence decoding circuit, 104 is a transmission path distortion elimination filter, 105 is a substitute signal generator, 106 is a switch circuit, 107 is a digital-to-analog converter (D/A converter), 108 is an output terminal of the television signal, 109 is a controller, and 110 is a timing signal generator.

The television signal entered through the input terminal 101 is fed to the timing signal generator 110, in which the sync signals and color burst are extracted separately and timing signals T1, T2 and T3 synchronous to these signals and system clock used in the ghost elimination device are reproduced.

The television signal is converted into a digital signal by the A/D converter 102 and it is fed to the input of the sequence decoding circuit 1030. The sequence decoding circuit 1030 uses delay lines of N in number (N is an integer) to produce a GCR signal delayed by N periods of transmission of the GCR signal, and implements the decoding operation for the transmission sequence of the GCR signal in each transmission period thereby to remove the distortion created by the previous line and extract only the GCR signal and the distortion created from the GCR signal. The decoded GCR signal is inserted to the television signal in its vertical flyback period in response to the timing signal T1 provided by the timing signal generator 110, and the resultant television signal is fed to the input of the transmission distortion elimination filter 104.

The transmission distortion elimination filter 104 is formed of a transversal filter, which produces a distortion with a polarity opposite to the distortion of the transmission path in accordance with the tap factor provided by the controller 109, and eliminates the distortion by applying the opposite distortion to the original signal.

It is known that the delay time of ghost caused by the distortion of transmission path ranges from $-2$ $\mu$s to 40 $\mu$s approximately. This transversal filter has taps to cover distortions of this range, and the filter taps always provide signals which precede the present signal by up to 40 $\mu$s.

The decode-processed GCR signal to be inserted to the television signal has been rid of the distortion mixed from the previous line, and therefore if the signal is fed intact through the transmission path distortion elimination filter 104, the distortion elimination signal produced from the signal of the previous line is added to the GCR signal, resulting adversely in the creation of distortion for the signal.

To cope with this matter, the timing signal T2 provided by the timing signal generator 110 is applied to the transmission path distortion elimination filter 104 by being timed to the previous line where the decode-processed GCR signal is inserted, so that the transversal filter which constitutes the distortion elimination filter 104 has its input replaced with a constant value R. Consequently, the transversal filter produces the signal for eliminating the distortion included in the GCR signal without the influence of the previous line, and correct distortion elimination for the GCR signal which has been rendered the decoding process by the transmission path distortion elimination filter 104 can be implemented.

The controller 109 receives on its input the output of the transmission path distortion elimination filter 104 thereby to introduce the decode-processed GCR signal in response to the timing signal T3 provided by the timing signal generator 110. Since the introduced GCR signal has been decoded for the transmission sequence by the sequence decoding circuit 1030, it can be used intact to detect the distortion of transmission path through such a process as 1-clock differentiation described in the publication mentioned previously.

The tap factor which determines the characteristics of correction of the transmission path distortion elimination filter 104 is evaluated from the introduced distortion information, and it is fed to the transmission path distortion elimination filter 104. In consequence, the GCR signal which is introduced next has its distortion component suppressed, and only a residual distortion is detected in the GCR signal and the tap factor is modified. This operation takes place many times iteratively, and in consequence the distortion of the transmission path is eliminated.

According to this embodiment, it is possible for the controller 109 to be supplied continuously with the GCR signal which has already been rendered the sequence decoding, eliminating the need for as long wait time as eight fields at each revision of tap factor, whereby the time expanded for the iterative processes of distortion elimination can be reduced.

Next, a specific example of the sequence decoding circuit and transmission path distortion elimination filter which constitute the inventive ghost elimination device will be explained on FIG. 15A.

In the figure, indicated by 1201 is an input terminal for entering the television signal to a sequence decoding circuit 1030, 1202, 1207 and 1210 are 1H delay circuits, 1203, 1217 and 1219 are switch circuits, 1204 is an output terminal for outputting the television signal from the sequence decoding circuit 1030, 1205 is a 4-field delay circuit, 1206 is a subtracter, 1208 is an inverter/non-inverter, 1209 is an integrator, 1211 is an input terminal for the timing signal T1, 1212 is an input terminal for entering the television signal to the transmission path distortion elimination filter 104, 1213 is an delay circuit, 1214 and 1215 are adders, 1216 is an output terminal for outputting the television signal from the transmission path distortion elimination filter 104, 1218 and 1222 are transversal filters, 1221 is an input terminal for tap factor data, and 1222 is an input terminal for the timing signal T2.

Figure 15A:
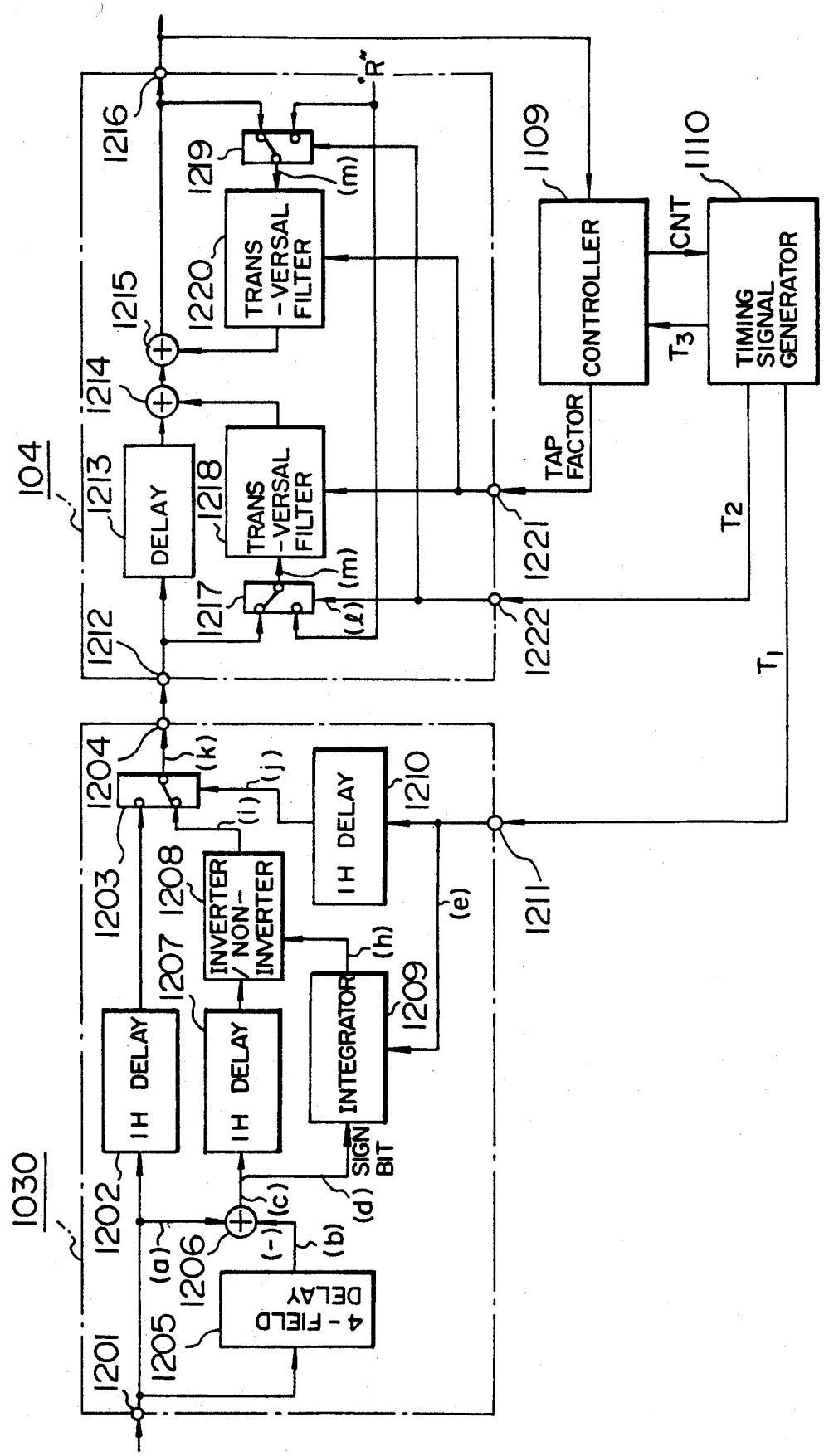
FIG. 15A is a block diagram showing a specific arrangement of the sequence decoding circuit and transmission distortion elimination filter in the ghost elimination device shown in FIG. 14.

FIG. 15B shows an example of operational waveforms of the arrangement shown in FIG. 15A. In the figure, shown by (a) is the television signal entered through the input terminal 1201, (b) is the output of the 4-field delay circuit 1202, (c) is the output of the subtracter 1206, (d) is the sign bit of the output of the subtracter 1206, (e) is the timing signal T1 entered through the input terminal 1211, (f), (g) and (h) are operational waveforms of the integrator 1209, (i) is the output of the inverter/non-inverter 1208, (j) is the output of the 1H delay circuit 1210, (k) is the output of the switch circuit 1203, (1) is the timing signal T2 entered through the input terminal 1222, and (m) is the output of the switch circuits 1217 and 1219.

The television signal shown by (a) in FIG. 15B is entered through the input terminal 1201, and it is delayed by 1H by the 1H delay circuit 1202 and fed to one input of the switch circuit 1203. The television signal is also fed to the input of the 4-field delay circuit 1205 and one input of the subtracter 1206.

The 4-field delay circuit 1205 produces a 4-field delayed version of its input as shown by (b) in FIG. 15B, and it is fed to another input of the subtracter 1206. The subtracter 1206 implements subtraction for the signals shown by (a) and (b) in FIG. 15B as shown by the polarities in FIG. 15A to produce the GCR signal, with other signals being cancelled out as shown by (c) in FIG. 15B. The result of subtraction is delayed by 1H by the 1H delay circuit 1207 and then fed to one input of the inverter/non-inverter 1208.

The bit indicative of the sign of the subtraction result is fed to the input of the integrator 1209, which delivers the output to one input of the inverter/non-inverter 1208, which has another input connected to the output of the 1H delay circuit 1207.

The subtracter 1206 produces on its output the calculation result shown by (c) in FIG. 15B, and the associated sign bit, which is "1" during the negative period of the decoded GCR signal as shown by (e) in FIG. 15B, is fed to the integrator 1209.

The timing signal T1 shown by (e) in FIG. 15B produced by the timing signal generator 1110 is entered through the input terminal 1211 and fed to the integrator 1209 and 1H delay circuit 1210.

The integrator 1209 is intended to detect the polarity of the GCR signal produced at the output of the subtracter 1206, based on the frequencies of signs of the bar waveform section. Namely, a line with a negative GCR waveform will have a negative polarity at a very high probability than the other case, and events of negative polarity are counted with a counter or the like to achieve the purpose. For example, the count operation of the counter is controlled by using the timing signal T1 and the sign bit as follows.

(1) The counter keeps a reset state during the low period of the timing signal T1.
(2) The counter counts the system clock during the period of a high timing signal T1 and a negative sign bit.
(3) The counter halts counting during the period of a high timing signal T1 and a positive sign bit.

Consequently, when the signal with the sign bit shown by (d) in FIG. 15B is entered to the integrator 1209, the counter has a large count value in fields of negative GCR signal as shown by (f) in FIG. 15B (the count value is shown as if it is an analog value). The count value is compared with a threshold value "S" with a comparator or the like and a bi-level signal as shown by (g) in FIG. 15B is obtained.

The signal is latched at the falling edge of the timing signal T1 shown by (e) in FIG. 15B, and the signal representing the polarity of the decoded GCR signal is produced as shown by (h) in FIG. 15B.

The polarity signal is fed to one input of the inverter/non-inverter 1208, which operates to produce an inverted version its input in response to the polarity signal of "1", or passes the input intact in response to "0". The inverter/non-inverter 1208 receives on its another input the decoded GCR signal which has been delayed by 1H by the 1H delay circuit 1207, and ultimately it produces on its output the GCR signal of the same polarity as shown by (i) in FIG. 15B.

The threshold value "S" is set to be 512, for example, based on that when sampling takes place at a frequency four times the color subcarrier frequency, the number of samples in 1H period is 910 and the number of samples of the bar waveform section of the GCR signal is about 640.

For the integrator 1209, it is also possible to apply a generally known random walk filter or N-before-M filter.

The inverter/non-inverter 1208 has its output fed to another input of the switch circuit 1203, which receives on its control input the timing signal T1 that is delayed by 1H by the 1H delay circuit 1210 as shown by (j) in FIG. 15B so that the sequence-decoded GCR signal inserted in the original signal is delivered to the output terminal 1204. The signal on the output terminal 1204 is delivered to the input of the delay circuit 1213 and one input of switch circuit 1217 by way of the input terminal 1212 of the transmission path distortion elimination filter 104.

The adder 1214 has one input connected to the output of the delay circuit 1213 and another input connected to the output of the transversal filter 1218, and its output is connected to one input of the adder 1215. The adder 1215 has another input connected to the output of the transversal filter 1220, and its output is connected to the output terminal 1216 and one input of the switch circuit 1219. The switch circuits 1217 and 1219 have another inputs fixed to the constant value "R", and their control inputs receive the timing signal T2 provided by the timing signal generator 1110 by way of the input terminal 1222. The output of the switch circuit 1217 is connect to the input of the transversal filter 1218, and the output of the switch circuit 1219 is connected to the input of the transversal filter 1220. The transversal filters 1218 and 1220 are supplied with tap factors provided by the controller 1109 by way of the input terminal 1221.

The timing signal T2 is applied to the switch circuits 1217 and 1219 in a timing relation shown by (1) in FIG. 15B so that the constant value "R" is multiplexed with the previous line of the inserted GCR signal. Consequently, the transversal filters 1218 and 1220 receive on their inputs the signal shown by (m) in FIG. 15B, thereby providing a distortion elimination signal which eliminates the distortion included in the GCR signal without the influence from the previous line. The adders 1214 and 1215 sum the distortion elimination signal and the original signal to remove the distortion, and deliver the resulting signal through the output terminal 1216.

The controller 1109 introduces the decode-processed GCR signal from the signal on the output terminal 1216 and calculates tap factors to be supplied to the transversal filters.

According to this embodiment, the controller is supplied in each field with the GCR signal which has been decoded for the transmission sequence, and such a long wait time as eight fields at each revision of tap factor is made unnecessary, whereby the time expended for the iterative processes of distortion elimination can be reduced.

In case the decoded GCR signal does not need to be inserted back to the original line, the 1H delay circuit can be eliminated, and the circuit scale can be reduced. By manipulating the 1H delay circuit 1202 to produce a delay time in multiple of 1H, the line where the GCR signal is inserted back can be selected arbitrarily.

The sequence decoding circuit 1030 of this embodiment only deals with the GCR signal, and through the time division operation of the 4-field delay circuit 1205, it can be configured with the memory capacity for storing only the line of GCR signal.

Next, the noise elimination filter and transmission path distortion elimination filter, which constitute the inventive ghost elimination device, based on another embodiment of this invention will be explained with reference to FIG. 16A. In the figure, indicated by 1605 is a subtracter, 1607 is a multiplier, 1608 is an adder, and 1609 is a 1-field delay circuit. Other functional blocks identical to those of FIG. 15A are referred to by the common symbols and reference numerals.

The television signal shown by (a) in FIGS. 16B-1 and 16B-2 is entered through the input terminal 1201, and it is delayed by 1H by the 1-H delay circuit 1202 and fed to one input of the switch circuit 1203. The television signal is also fed to the input of the 4-field delay circuit 1205 and one input of the subtracter 1206.

The 4-field delay circuit 1205 delays its input by four fields to produce an output shown by (b) in FIG. 16B-1 (16B-2). The output is fed to another input of the subtracter 1206, which implements subtraction for the signals (a) and (b) as shown by the polarities in FIG. 16A, thereby producing a signal in which components other than the GCR signal are cancelled out as shown by (c). The resultant signal is delayed by 1H by the 1H delay circuit 1207 and fed to one input of the inverter/non-inverter 1208.

The bit indicative of the sign of subtraction result is fed to the input of the integrator 1209, which integrates sign bits in the same manner as the preceding embodiment thereby to detect the GCR signal of the field of the negative subtraction result. The integrator 1209 delivers the integration output to one input of the inverter/non-inverter 1208 at the falling edge of the timing signal T1 shown by (e). The inverter/non-inverter 1208 operates identically to the embodiment of FIG. 15A, causing negative GCR signals among signals from the 1H delay circuit 1207 to be inverted, resulting in the production of GCR signals with the same polarity in every field as shown by (i).

The output of the inverter/non-inverter 1208 is fed to the input of a differentiator 1610 which is made up of a subtracter 1601 and registers 1602 and 1603. The output of the differentiator 1610 is fed to one input of the subtracter 1601 and the input of the register 1602. The register 1602 has its output fed to the input of the register 1603, which has its output fed to another input of the subtracter 1601. The registers 1602 and 1603 are driven by the sampling clock of the A/D converter, and they delay their inputs by a clock period. Consequently, the subtracter 1601 implements subtraction for the signals which are out of phase by two clock periods to produce a differentiated waveform shown by (j). The output of the differentiator 1610 is delivered to the noise elimination circuit.

The noise elimination circuit is a digital filter of the cyclic type made up of a subtracter 1605, multiplier 1607, adder 1608, and 1-field delay circuit 1609. The output of the differentiator 1610 is fed to one input of the subtracter 1605. The output of the subtracter 1605 is multiplied by a factor K2 ($1 < K2 < 0$) by the multiplier 1607, and the result is fed to another input of the adder 1608, which has its output fed to one input of the switch circuit 1203 and the input of the 1-field delay circuit 1609. The 1-field delay circuit 1609 delays its input and delivers the output to another inputs of the subtracter 1605 and adder 1608.

The noise elimination circuit of the preceding embodiment has the following transfer function N1(Z).

$$N1(Z) = (1-K)/(1-K \cdot Z^{-1}) \ldots \quad (6)$$

The noise elimination circuit of this embodiment has the following transfer function N2(Z).

$$N2(Z) = K2/(1-(1-K2) \cdot Z^{-1}) \ldots \quad (7)$$

Placing K2=1−K, the equation (5) has the same form as the equation (2), indicating a transfer function similar to that of the preceding embodiment.

According to this embodiment, the reference signal which has been rendered the differential process with the s/n improvement as in the preceding embodiment can be obtained in every field at the output of the adder 1608.

The output of the adder 1608 is fed to another input of the switch circuit 1203. The switch circuit 1203 has its control input supplied with the timing signal T1 which is delayed by 1H by the 1H delay circuit 1210 as shown by (k), so that it delivers the reference signal, which has been rendered the noise elimination and differential process and inserted in the original signal as shown by (l), to the output terminal 1204.

The signal led out of the output terminal 1204 is fed to the input terminal 1212 of the transmission path distortion elimination filter 104. The filter 104 operates identically to the embodiment of FIG. 15A, processing the multiplexed reference signal correctly, and the controller 1109 calculates tap factors to be applied to the transversal filters from the reference signal.

According to this embodiment, the transmission sequence is decoded in the same manner as the preceding embodiment and the differential-processed reference signal is supplied to the controller in every field, whereby the wait time for the 8-field process for each tap factor revision and the noise elimination process can be eliminated, and in addition the differential process for evaluating the sinX/X signal from the bar signal by the controller 109 can be eliminated, whereby the time expended for the iterative processes of distortion elimination can be reduced.

Also in this embodiment, if the reference signal which has been rendered the decoding process, differential process and noise elimination process does not need to be inserted back to the original line, the 1H delay circuit can be removed and the circuit scale can be reduced. By manipulating the 1H delay circuit 1202 in multiple of 1H, the line where the reference signal is inserted back can be selected arbitrarily.

Although in this embodiment the differentiator 1610 operates in 2-clock differentiation, the same effectiveness is achieved through the 1-clock differentiation or that of three or more clock intervals because of the internal reference signal of the controller 1109.

Other embodiment can be applied to the decoding means for the reference signal to be supplied to the noise elimination circuit, and it can be combined with other embodiment of the transmission path distortion elimination filter 104.

Another possible configuration is the disposition of the noise elimination circuit explained on FIG. 16A in front of the differentiator 1610 so that the signal after noise elimination is subjected to the differential process.

This embodiment can also be applied to the configuration made up of the subtracter 1605, multiplier 1607, adder 1608 and 1-field delay circuit 1609, but without a noise elimination circuit.

Although in the foregoing embodiments the GCR signal of 8-field sequence is used for the ghost detection, other reference signal may be used to achieve the same role.

Next, another specific example of the sequence decoding circuit and transmission path distortion elimination filter which constitute the inventive ghost elimination device will be explained with reference to FIG. 17.

In the figure, indicated by 1301 and 1302 are inverter/non-inverters, 1303 is an adder, 1304 is a comparator, 1305 is an integrator, 1306 is a delay circuit, 1307 is a NOT gate, and 1308–1310 are switch circuits. Remaining functional blocks are identical to those of the preceding embodiment.

Figure 17:
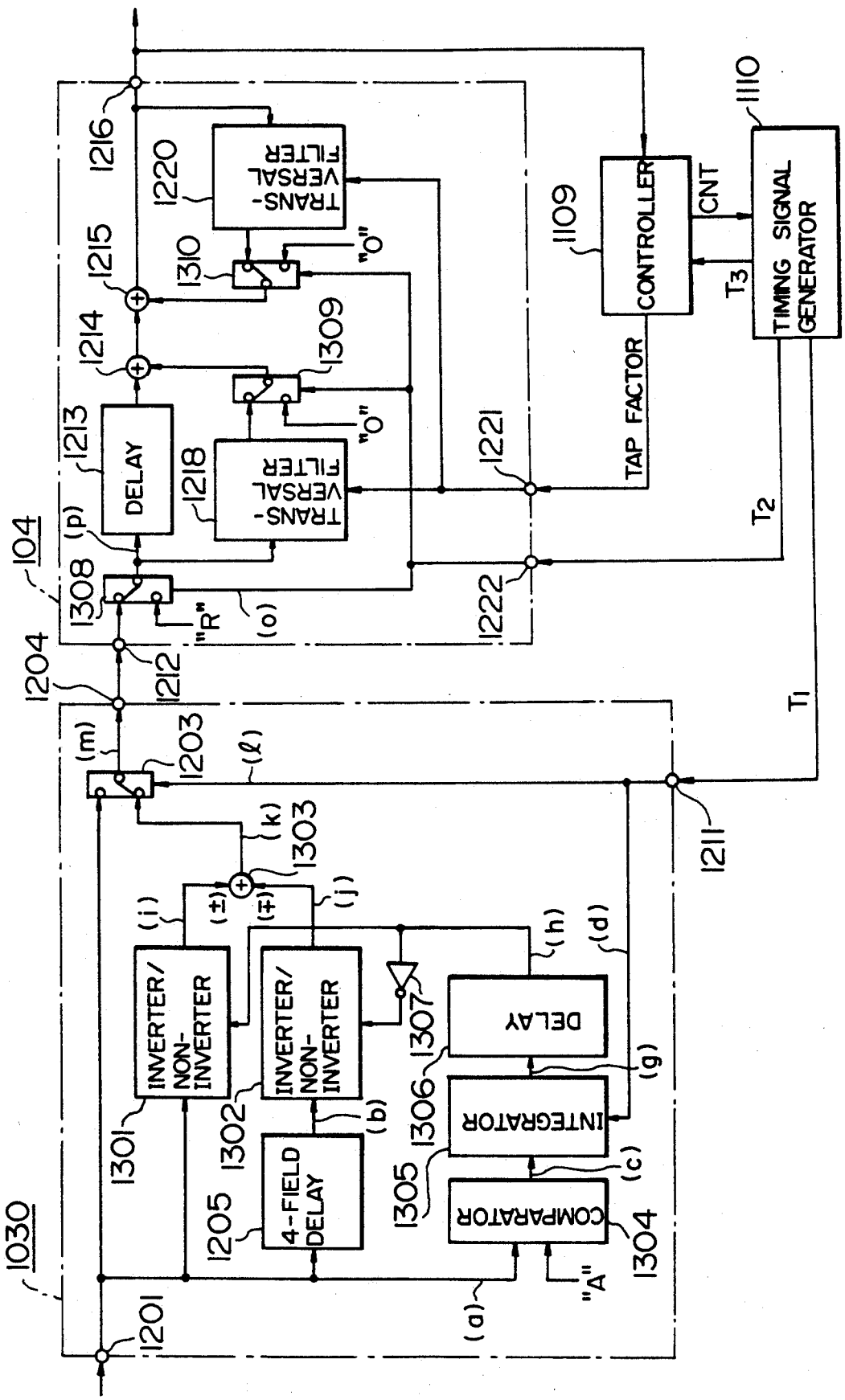
FIG. 17 is a block diagram showing, as another embodiment, a specific arrangement of the sequence decoding circuit and transmission distortion elimination filter in the ghost elimination device shown in FIG. 14.
Figure 18:
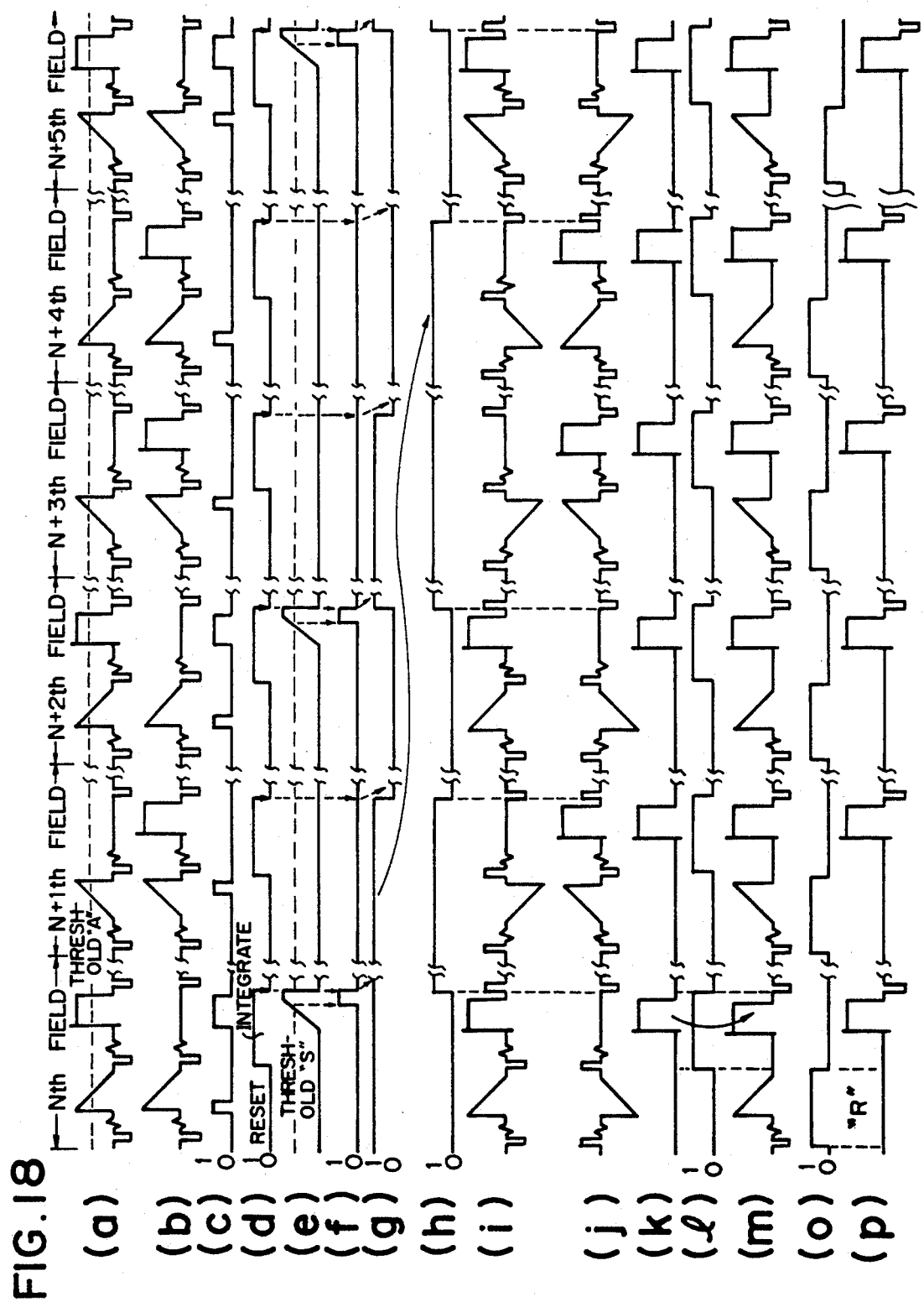
FIG. 18 is a waveform diagram showing the major signal waveforms of the circuit shown in FIG. 17.

FIG. 18 shows an example of the operational waveforms of the arrangement shown in FIG. 17. In the figure, shown by (a) in the television signal entered through the input terminal 1201, (b) is the output of the 4-field delay circuit 1205, (c) is the output of the comparator 1304, (d) is the timing signal T1 entered through the input terminal 1211, (e), (f) and (g) are operational waveforms of the integrator 1305, (h) is the output of the delay circuit 1306, (i) is the output of the inverter/non-inverter 1301, (j) is the output of the inverter/non-inverter 1302, (k) is the output of the adder 1303, (l) is the signal applied to the control input of the switch circuit 1203, (m) is the output of the switch circuit 1203, (o) is the timing signal T2 entered through the input terminal 1222, and (p) is the output of the switch circuit 1308.

The television signal shown by (a) in FIG. 18 is entered through the input terminal 1201, and it is fed to one input of the switch circuit 1203, the input of the 4-field delay circuit 1205, one input of the comparator 1304, and one input of the inverter/non-inverter 1301.

The 4-field delay circuit 1205 delays its input signal by four fields to produce a signal as shown by (b) in FIG. 18, and the output signal is fed to one input of the inverter/non-inverter 1302.

The comparator 1304 compares the input television signal with a threshold value "A" on its another input to produce a bi-level signal as shown by (c) in FIG. 18, and the bi-level television signal is fed to the input of the integrator 1305. The integrator 1305 also receives the timing signal T1 shown by (d) provided by the timing signal generator 1110 through the input terminal 1211.

The integrator 1305 operates to detect whether the GCR signal entered to the 4-field delay circuit 1205 is a bar signal or pedestal signal, based on the frequency of events of the GCR signal multiplexed line in excess of the threshold value "A". For example, with the threshold value "A" being set as shown by (a) by the dashed line, the probability of the occurrence of the value indicated by the bi-level signal becomes opposite between the case of the pedestal signal multiplexed and the case of the bar signal multiplexed. Accordingly, by counting events of signals in excess of the threshold value "A" for example, the input signal can be distinguished. The detection can be accomplished by means based on the integration of sign as in the preceding embodiment by using the output of the integrator 1304 and timing signal T1.

Accordingly, when the bi-level signal of (c) is entered to the integrator, the counter has a large count value for fields with the entry of the bar signal as shown by (e). The count value is formed into a bi-level signal as shown by (f) as in the preceding embodiment, and the signal is latched at the falling edge of the timing signal T1 thereby to obtain a discrimination signal as shown by (g) in FIG. 18.

The discrimination signal is fed to the input of the delay circuit 1306 so that it is delayed until the signal on the input of the comparator 1304 passes through the 4-field delay circuit 1205 and reaches the input of the inverter/non-inverter 1302, as shown by (h) in FIG. 18.

The output of the delay circuit 1306 is fed to another input of the inverter/non-inverter 1301 and to another input of the inverter/non-inverter 1302 through the NOT gate 1307. Consequently, the discrimination result of the signal produced by the 4-field delay circuit 1504 is fed to the inverter/non-inverters 1301 and 1302 at the same time.

The inverter/non-inverters 1301 and 1302 invert the signals on another inputs when the discrimination signal is "1", or pass the signals intact in response to "0". As a result, the inverter/non-inverter 1301 provides on its output the signal which is inverted for fields where the pedestal signal is inserted, as shown by (i) in FIG. 18. The inverter/non-inverter 1302 receives the inverted version of the discrimination signal made by the NOT gate 1307, and it provides the signal which is inverted for fields where the pedestal signal is inserted, as shown by (j) in FIG. 18.

The outputs of the inverter/non-inverters 1301 and 1302 are summed by the adder 1303, and the GCR signal having the same polarity is obtained in every field as shown by (k) in FIG. 18. The output of the adder 1303 is fed to another input of the switch circuit 1203, which receives on its control input the timing signal T1 shown by (1), which controls the circuit 1203 to multiplex the sequence decoded GCR signal and the original signal as shown by (m) and deliver the result to the output terminal 1204.

The signal led out of the output terminal 1204 is fed to another input of the switch circuit 1308 by way of the input terminal 1212 of the transmission path distortion elimination filter 104. The switch circuit 1308 has another input fixed to a constant value "R" and is supplied on its control input with the timing signal T2 provided by the timing signal generator 1110 by way of the input terminal 1222.

The timing signal T2 has a timing relation as shown by (o) in FIG. 18 and it controls the switch circuit so that the constant value "R" is multiplexed with the previous line of the inserted-back GCR signal. Consequently, the switch circuit 1308 provides on its output a television signal which is the sequence-decoded GCR signal multiplexed with the signal for preventing the mixing of the distortion from the previous line.

This television signal is fed to the inputs of the delay circuit 1213 and transversal filter 1218. The adder 1214 has one input connected to the output of the delay circuit 1213 and another input connected to the output of the switch circuit 1309. The switch circuit 1309 has its one input connected to the output of the transversal filter 1218 and another input fixed to zero. The adder 1215 has one input connected to the output of the adder 1214 and another input connected to the output of the the switch circuit 1310, which has one input connected to the output of the transversal filter 1220 and another input fixed to zero.

The output of the adder 1215 is connected to the output terminal 1216 and the input of the transversal filter 1220. The switch circuits 1309 and 1310 receive on their control inputs the timing signal T2 introduced through the input terminal 1222, and are controlled to output zero during the period when the switch circuit 1308 selects the constant value "R" for its output. The transversal filters 1218 and 1220 are supplied with tap factors provided by the controller 1109 through the input terminal 1221.

Accordingly, both filters 1218 and 1220 produce zero outputs during the period when they receive the constant value "R" inserted to the previous line of the inserted-back GCR signal, and the constant value "R" is fed intact to the input of the transversal filter. Consequently, the signals for eliminating the distortion of the inserted-back GCR signal can be obtained from the transversal filters 1218 and 1220 without the influence of the previous line.

The controller 1109 introduces the GCR signal which has been decoded from the signal delivered on the output terminal 1226 and calculates tap factors to be fed to the transversal filters.

According to this embodiment, as in the preceding embodiment, the GCR signal which has been decoded for the transmission sequence can be supplied to the controller in every field, and such a long wait time as eight fields at each revision of tap factor is eliminated and the time expended for the iterative operations of distortion elimination can be reduced.

Because of the polarity discrimination in the sequence decoding process based on the input signal, the 1H delay circuit of the previous embodiment can be removed and the circuit scale can be reduced.

In case the GCR signal is to be inserted back to other line, it is made possible through the provision of a delay line on the path between the input terminal 1201 and switch circuit 1203 or between the adder 1303 and switch circuit 1203.

Also in this embodiment, as in the preceding embodiment, the memory capacity can be reduced through the time division operation of the 4-field delay circuit 1205.

Figure 19:
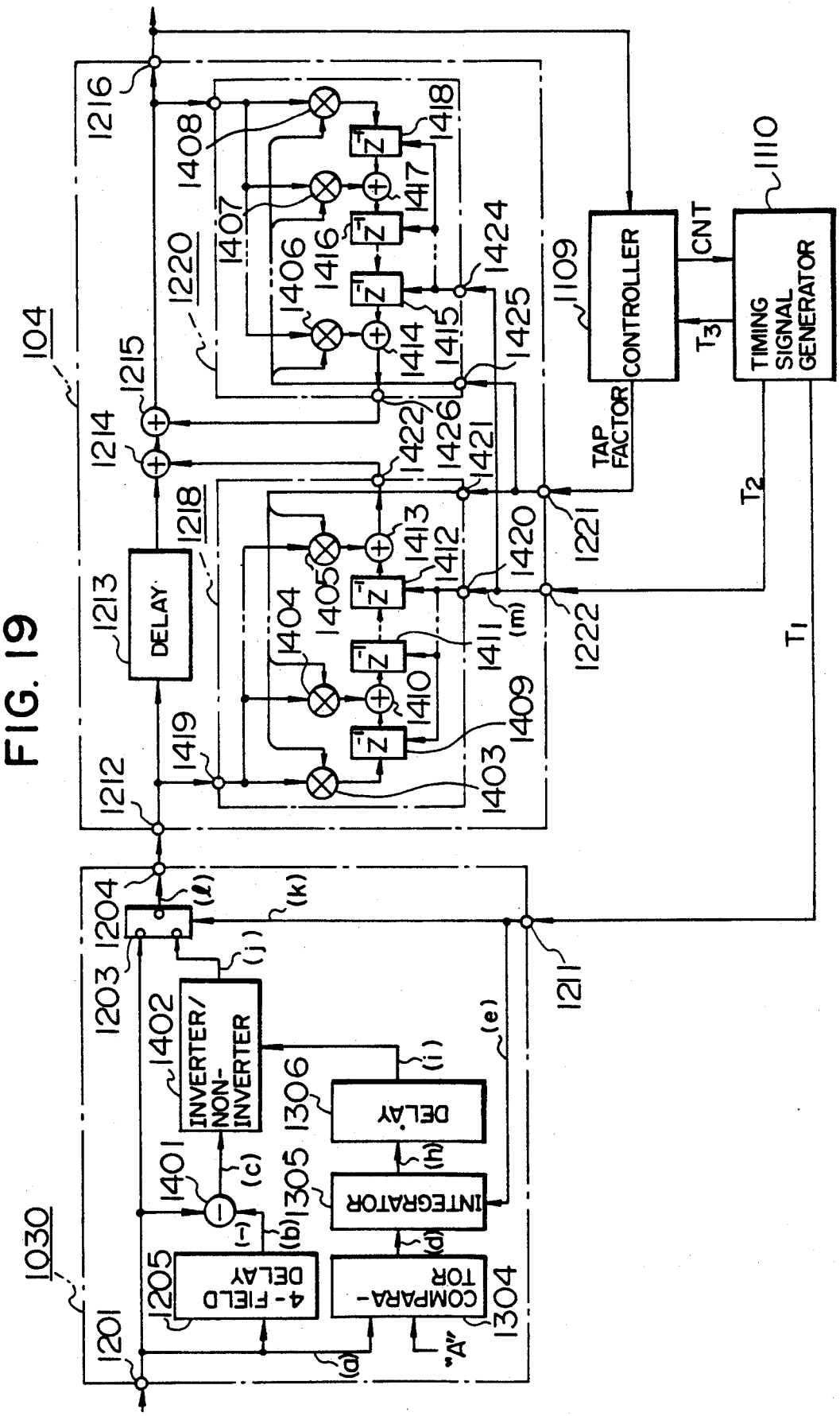
FIG. 19 is a block diagram showing, as still another embodiment, a specific arrangement of the sequence decoding circuit and transmission distortion elimination filter in the ghost elimination device shown in FIG. 14.

Next, still another specific example of the sequence decoding circuit and transmission path distortion elimination filter which constitute the inventive ghost elimination device will be explained with reference to FIG. 19.

In the figure, indicated by 1401 is a subtracter, 1402 is an inverter/non-inverter, 1403–1405 are multipliers which constitute a transversal filter 1218, 1406–1408 are multipliers which constitute a transversal filter 1220, 1409-1412 are registers which constitute tapped delay lines of the transversal filter 1218, 1410 and 1413 are adders in the transversal filter 1218, 1414 and 1417 are adders in the transversal filter 1220, 1415-1418 are registers which constitute the tapped delay lines of the transversal filter 1220, 1419 is an input terminal for entering the television signal to the transversal filter 1218, and 1420 is an input terminal for entering the timing signal T2 to the transversal filter 1218.

Further indicated by 1421 is an input terminal for entering tap factor data to the transversal filter 1218, 1422 is an output terminal of the transversal filter 1218, 1423 is an input terminal for entering the television signal to the transversal filter 1220, 1424 is an input terminal for entering the timing signal T2 to the transversal filter 1220, 1425 is an input terminal for entering the tap factor data to the transversal filter 1220, and 1426 is an output terminal of the transversal filter 1220. Remaining functional blocks are identical to those of the preceding embodiment.

Figure 20:
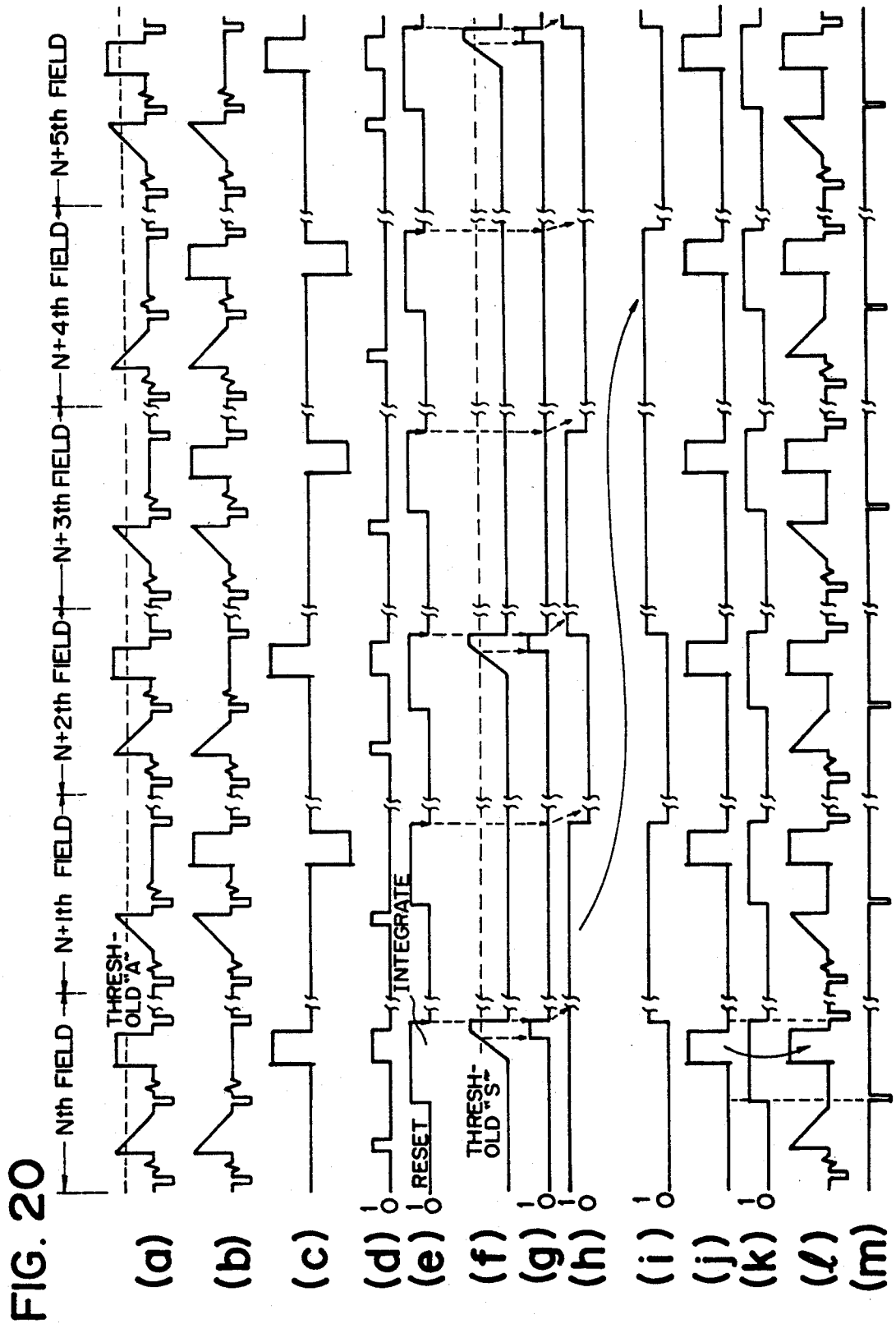
FIG. 20 is a waveform diagram showing the major signal waveforms of the circuit shown in FIG. 19.

FIG. 20 shows an example of the operation. In the figure, shown by (a) is the television signal entered through the input terminal 1201, (b) is the output of the 4-field delay circuit 1205, (c) is the output of the subtracter 1401, (d) is the output of the comparator 1304, (e) is the timing signal T1 entered through the input terminal 1211, (f), (g) and (h) are operational waveforms of the integrator 1305, (i) is the output of the delay circuit 1306, (j) is the output of the inverter/non-inverter 1402, (k) is the signal entered to the control input of the switch circuit 1203, (1) is the output of the switch circuit 1203, and (m) is the timing signal T2 entered through the input terminal 1222.

The television signal shown by (a) in FIG. 20 is entered through the input terminal 1201 and fed to one input of the switch circuit 1203, the input of the 4-field delay circuit 1205, the input of the comparator 1304, and one input of the subtracter 1401. The 4-field delay circuit 1205 delays its input signal by four fields, as in the preceding embodiment, to produce a signal as shown by (b). This output signal is fed to another input of the subtracter 1401. Accordingly, the subtracter 1401 implements the subtraction for the signals (a) and (b) as shown by the polarities in FIG. 19, and produces an output in which signals other than the GCR signal are cancelled out as shown by (c) in FIG. 20. The subtraction result is fed to one input of the inverter/non-inverter 1402.

The comparator 1304 compares the television signal with the threshold value "A" on its another input, as in the preceding embodiment, to produce a bi-level signal shown by (d). This bi-level television signal is fed to the input of the integrator 1305.

The timing signal T1 shown by (e) provided by the timing signal generator 1110 is fed to the integrator 1305 by way of the input terminal 1211. The integrator 1305 detects whether the GCR signal entered to the 4-field delay circuit 1205 is the bar signal or pedestal signal, as in the preceding embodiment. In the integrator 1305 which receives the bi-level signal (d), the counter produces a large count value for fields with the entry of bar signal as shown by (f). The count value is formed into a bi-level signal shown by (g) as in the preceding embodiment, and it is latched at the falling edge of the timing signal T1 to obtain a discrimination signal shown by (h) in FIG. 20.

The discrimination signal is fed to the input of the delay circuit 1306 so that it is delayed until the signal on the input of the comparator 1304 passes through the 4-field delay circuit 1205 and reaches the input of the inverter/non-inverter 1302, as shown by (i) in FIG. 20.

The output of the delay circuit 1306 is fed to another input of the inverter/non-inverter 1402. The inverter/non-inverter 1402 inverts the signal on another inputs when the discrimination signal is "1", or pass the signals intact in response to "0". As a result, it provides on its output the GCR signal with the same polarity as shown by (j) in FIG. 20.

The output of the inverter/non-inverter 1402 is fed to another input of the switch circuit 1203, which receives on its control input the timing signal T1 shown by (k), which controls the circuit 1203 to multiplex the sequence decoded GCR signal and the original signal as shown by (1) and deliver the result to the output terminal 1204.

The signal led out of the output terminal 1204 is fed to the input of the delay circuit 1213 and the input terminal 1419 of the M-tapped (M is an integer) transversal filter 1218 by way of the input terminal 1212 of the transmission path distortion elimination filter 104. The television signal entered through the input terminal 1419 is fed to one inputs of the multipliers 1403–1405 of M in number which constitute the transversal filter 1218. These multipliers 1403–1405 have another inputs supplied through the input terminal 1420 with tap factors entered through the input terminal 1222.

The tapped delay line of transversal filter 1218 formed of registers 1409–1412 of M-1 in number delays the inputs by one sampling period and delivers the outputs to one inputs of the corresponding adders 1410–1413 of M-1 in number, so that the outputs of the multipliers 1403–1405 entered to their another inputs are summed cumulatively, and the cumulative multiplication result is fed to one input of the adder 1214. The adder 1214 has another input supplied with the output of the delay circuit 1213.

The delay circuit 1213 is intended to make in-phase with the output of the transversal filter 1218, and, assuming that the center tap of the transversal filter is the Mth tap, it implements a delay of M sampling periods.

As a consequence of the above process, a distortion elimination signal for cancelling out the distortion which has been created in samples earlier by M samples or more with respect to the current signal is provided by the transversal filter 1218, and the adder 1214 provides on its output the signal, with the distortion in this range being suppressed, which is delivered to one input of the adder 1215.

The output of the adder 1215 is fed to the output terminal 1216 and the input terminals of multipliers 1406-1408 of L in number (L is an integer) which form the transversal filter 1220 through the input terminal 1423. The multipliers 1406-1408 have another inputs supplied with tap factors through the input terminal 1425 entered through the input terminal 1221.

The tapped delay line of the transversal filter 1220 formed of registers 1415-1418 of L-1 in number delays the inputs by one sampling period and delivers the results to the inputs of adders 1414-1417 of L-1 in number, so that the outputs of the multipliers 1406-1408 received on their another inputs are summed cumulatively. The cumulative multiplication result is fed to another input of the adder 1215 by way of the output terminal 1426.

As a consequence of the above process, a distortion elimination signal for cancelling out the distortion which has been created in samples up to Lth successive sample with respect to the current signal is provided by the transversal filter 1220, and the adder 1215 provides on its output the signal, with the distortion in this range being suppressed.

In consequence, the transmission path distortion elimination filter 104 provides on its output 1216 a television signal which is rid of distortion in the range from $-M$ to $+M$ samples with respect to the current signal.

The registers 1409-1412 and registers 1415-1418 which constitute the tapped delay lines of the transversal filters 1218 and 1220 have terminals for initialization, which are connected to the input terminals 1420 and 1424, respectively. The transversal filters 1218 and 1220 have their input terminals 1420 and 1424 supplied with the timing signal T2 provided by the timing signal generator 1110 through the input terminal 1222.

The timing signal T2 which is fed to the initialization input terminals of these registers goes "0" for one sampling period by being timed to the entry of the first sampled value of the inserted-back GC signal to the transversal filter, as shown by (m) in FIG. 20, so that all of these registers are initialized to zero for example.

Consequently, the distortion elimination signal produced from the signal of previous line which has been stored in these registers is replaced with the initial value and the successive inserted-back GCR signal is not affected by the former signal.

According to this embodiment, as in the preceding embodiment, the GCR signal which has been decoded for the transmission sequence can be supplied to the controller in every field, and such a long wait time as eight fields at each revision of tap factor is eliminated and the time expended for the iterative operations of distortion elimination can be reduced.

In this embodiment, polarity discrimination in the sequence decoding process is based on the input signal and the polarity is unified through the control of the subtraction result, and therefore the 1H delay circuit and inverter/non-inverter used in the preceding embodiment can be removed and the circuit scale can be reduced. This embodiment can also eliminate the distortion of the previous line based on its ability of removing the distortion elimination signal which is produced from the signal of the previous line immediately before the entry of the inserted-back GCR signal.

If it is intended to insert the GCR signal back to another line in this embodiment, it is made possible through the provision of a delay line on the path between the input terminal 1201 and switch circuit 1203 or on the path between the inverter/non-inverter 1402 and switch circuit 1203. Also in this embodiment, as in the preceding embodiment, the memory capacity can be reduced by operating the 4-field delay line 1205 on a time division basis.

It is apparent that the sequence decoding circuit 1030 and the transmission path distortion elimination filter 104 in the preceding embodiments are combined arbitrarily to accomplish the intended operation.

Figure 21:
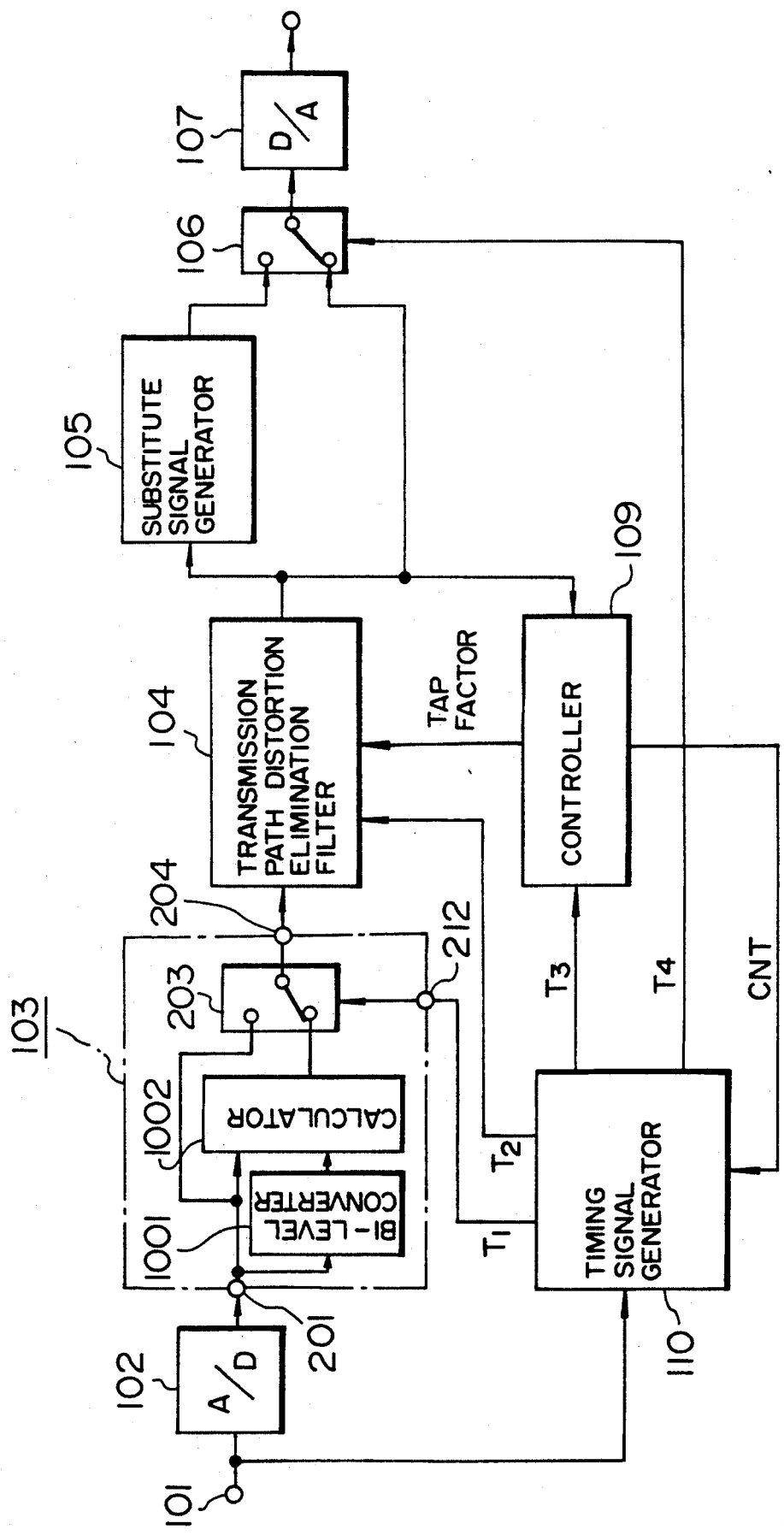
FIG. 21 is a block diagram showing still another embodiment of this invention which implements ghost elimination by using a random signal.

Next, still another embodiment of the reference signal preprocessing circuit and transmission path distortion elimination filter which constitute the inventive ghost elimination device will be described with reference to FIG. 21. In the figure, indicated by 1001 is a bi-level conversion circuit, 1002 is a correlation calculation circuit, and other functional blocks are identical to those with the same reference symbols in FIG. 1.

This embodiment is intended for ghost elimination using a random signal, as disclosed in Japanese Patent Unexamined Publication No. 63-121392. As shown in FIG. 3 of the patent publication No. 63-121392, the correlation between the received random signal and the bi-level version of that signal is evaluated thereby to provide the autocorrelation as the reference and the correlation which reflects the ghost.

In this embodiment, the received random signal is reformed into a bi-level signal by a bi-level conversion circuit 1001 and the correlation between the bi-level signal and received random signal is evaluated by a correlation calculation circuit 1002 in the reference signal preprocessing circuit 103. The resultant signal and the picture signal are fed selectively through the switch circuit 203 to the transmission path distortion elimination filter 104, and the tap factor of the filter is revised sequentially, in the same manner as the case of FIG. 1. If necessary, the noise elimination circuit made up of the subtracters 508 and 510, 1-field delay circuit 509 and multiplier 511, or the noise elimination circuit made up of the subtracter 1605, multiplier 1602, adder 1603 and 1-field delay circuit 1609 may be placed in front of the switch circuit 203 with the intention of the averaging process with the correlation result of a different random signal sequence, whereby ghost detection and elimination of enhanced measurement accuracy can be accomplished.

According to this embodiment, the reference signal which has been rendered the correlation calculation process can be supplied to the controller in every field, as in the preceding embodiment, even in the case of using a random signal as a reference signal for ghost elimination, whereby the wait time for the correlation calculation process at each tap revision and the noise elimination process can be eliminated and the time expended for the iterative processes of distortion elimination can be reduced.

We claim:

1. A ghost reduction device for reduction of ghost components in a television (TV) signal, comprising:
reference signal preprocessing means for receiving an input of the TV signal transmitted with a periodic reference signal to be used for the reduction of the ghost components, wherein said preprocessing means is comprised of one of noise elimination means for eliminating noise from the reference signal and decode means for decoding a predetermined sequence of the periodic reference signal, thereby outputting a preprocessed output signal representative of the reference signal;

transmission path distortion elimination filter, having a controllable filtering characteristic and coupled to said preprocessing means for receiving the preprocessed output signal to suppress the ghost components thereof and to output therefrom a ghost-suppressed signal; and control means for receiving the ghost-suppressed signal from said filter in order to extract from the received ghost-suppressed signal a ghost-suppressed reference signal including one having residual ghost components of said preprocessed output signal and for detecting any residual ghost components, wherein the filtering characteristic of said transmission path distortion elimination filter is controllably in accordance with the detection of residual ghost components.

2. A ghost elimination device for eliminating, from a television signal, a ghost component as a distortion of a television signal transmission system, said device comprising:

a noise elimination filter which receives the television signal, with a reference signal used for ghost component detection being multiplexed thereon, and performs noise elimination for the reference signal;

a transmission path distortion elimination filter, which includes at least a transversal filter with a controllable tap factor, receives the television signal from the output of said noise elimination filter and removes a ghost component as a transmission path distortion; and a controller which extracts the reference signal from the output signal of said transmission path distortion elimination filter, detects the ghost component as a transmission path distortion based on the reference signal, and operates on said transmission path distortion elimination filter to eliminate the ghost component as a transmission path distortion by controlling the tap factor of the transversal filter in said transmission path distortion elimination filter.

3. A ghost elimination device for eliminating, from a television signal, a ghost component as a distortion of a television signal transmission system, said device comprising:

an input terminal for receiving the television signal, the television signal having a reference signal used for ghost component detection multiplexed thereon as a sequence over a plurality of fields;

decoding means for extracting, by decoding, the reference signal in the form of a sequence from the television signal received on said input terminal;

noise elimination means for providing noise elimination for the reference signal which has been decoded by said decoding means;

reference signal insertion means for inserting the decoded and noise-eliminated reference signal to the television signal received on said input terminal;

a transmission path distortion elimination filter, which includes at least a transversal filter with a controllable tap factor, receives the television signal in which the reference signal has been inserted by said reference signal insertion means, and removes a ghost component as a transmission path distortion; and a controller which extracts the reference signal from the output signal of said transmission path distortion elimination filter, detects the ghost component as a transmission path distortion based on the reference signal. and operates on said transmission path distortion elimination filter to eliminate the ghost component as a transmission path distortion by controlling the tap factor of the transversal filter in said transmission path distortion elimination filter.

4. A ghost elimination device according to claim 2, wherein said noise elimination filter comprises means including a delay circuit having a delay time equal to the period of iteration of the reference signal transmitted as a sequence over a plurality of fields, and implementing the noise elimination for the reference signal by using said delay circuit.

5. A ghost elimination device according to claim 2, wherein said noise elimination filter comprises:

an input terminal for receiving the television signal, with a reference signal used for ghost component detection being multiplexed thereon; a delay circuit which receives the television signal on said input terminal through a first subtracter and has a delay time equal to the period of iteration of the reference signal transmitted as a sequence over a plurality of fields; a second subtracter which implements the subtraction between the television signal on said input terminal and the output of said delay circuit; a multiplier which multiplies the output of said second subtracter by a factor K, where $0 < K - 1$, and provides the multiplied output as an input to the first subtracter; said first subtracter which provides subtraction between the output of said multiplier and the television signal on said input terminal delivers the result to said delay circuit; and multiplexing means which multiplexes the television signal and the noise-eliminated reference signal provided by said first subtracter on said input terminal.

6. A ghost reduction device according to claim 3, wherein said decode means comprises: 'a 4-field delay line coupled to receive the television signal, having said reference signal multiplexed thereon, and outputting the television signal delayed by 4 fields;

a subtracter for providing subtraction between the received television signal and the outputted delayed television signal of said delay line and outputting the result thereof as a subtraction output signal; and arithmetic operation means for receiving said subtraction output signal to produce a corresponding output signal of a unipolarity.

7. A ghost elimination device according to claim 3, wherein said decoding means comprises:

a 4-field delay circuit which delays the television signal with the reference signal by four fields when the reference signal is an 8-field sequence signal; a subtracter which implements the subtraction between the input signal and output signal of said 4-field delay circuit to produce a reference signal waveform with a positive or negative polarity; a 1H delay circuit which delays the reference signal waveform from said subtracter by 1H, where 1H denotes one horizontal scanning period; an integrator which integrates the output signal of said subtracter indicative of the polarity of the reference signal waveform from said subtracter; and a multiplier which provides multiplication between the output of said 1H delay circuit and the output of said integrator.

8. A ghost elimination device according to claim 3, wherein said decoding means comprises: a 4-field delay circuit which delays the television signal with the reference signal by four fields when the reference signal is an 8-field sequence signal; a comparator which compares the television signal on the input of said 4-field delay circuit with a predetermined threshold value; an integrator which integrates the output of said comparator; delay circuits which delay the output of said integrator; and summing means which sums the input and output of said 4-field delay circuit after one of the input and output of said 4-field delay circuit is inverted in response to the output of said delay circuits.

9. A ghost elimination device according to claim 2 or 3 comprising a signal replacement means which replaces the previous line of the noise-eliminated reference signal from said noise elimination filter with a fixed-level signal, and introduces the resultant signal to said transmission path distortion elimination filter, said introduced signal being fed to the transversal filter in said transmission path distortion elimination filter.

10. A ghost elimination device according to claim 9 comprising means of inhibiting the output of said transversal filter during a period when the signal of the previous line of the noise-eliminated reference signal is entered to said transversal filter in said transmission path distortion elimination filter.

11. A ghost elimination device for eliminating, from a television signal, a ghost component as a distortion of a television signal transmission system, said device comprising:

a transmission path distortion elimination filter, which receives the television signal multiplexed with a reference signal used for ghost component detection, includes at least a transversal filter with a controllable tap factor and removes a ghost component as a transmission path distortion;

a controller which extracts the reference signal from the output signal of said transmission path distortion elimination filter, detects the ghost component as a transmission path distortion based on the reference signal, and operates on said transmission path distortion elimination filter to eliminate the ghost component as a transmission path distortion by controlling the tap factor of the transversal filter in said transmission path distortion elimination filter; and reference signal blocking means for replacing the reference signal inserted in a line with another signal for the output of said transmission path distortion elimination filter so as to block the passage of the reference signal to a rear stage.

12. A ghost elimination device according to claim 11, wherein said reference signal blocking means comprises a delay circuit which delays the output of the transmission path distortion elimination filter by a multiple of 2H, where 1H denotes one horizontal scanning period, and a switch circuit which replaces the reference signal inserted in a line with the output signal of said delay circuit for the output of said transmission path distortion elimination filter.

13. A ghost elimination device for eliminating, from a television signal, a ghost component as a distortion of a television signal transmission system, said device comprising:

decoding means, which receives the television signal containing a reference signal used for ghost component detection, decodes a transmission sequence that forms said reference signal;

reference signal inserting means, which receives the transmission sequence signal provided by said decoding means and the television signal, inserts the transmission sequence signal to the television signal;

a transmission path distortion elimination filter, which includes at least a transversal filter with a controllable tap factor, receives the output of said reference signal inserting means and removes a ghost component as a transmission path distortion from the television signal; and a controller, which extracts the reference signal from the output signal of said transmission path distortion elimination filter, detects the ghost component as a transmission path distortion based on the reference signal, and operates on said transmission path distortion elimination filter to eliminate the ghost component as a transmission path distortion from the television signal by controlling the tap factor of the transversal filter in said transmission path distortion elimination filter.

14. A ghost elimination device according to claim 13, wherein said decoding means comprises:

a 4-field delay circuit which delays the television signal by four fields; subtracting means for implementing the subtraction between the input signal and output signal of said 4-field delay circuit; and polarity unifying means for providing a unified polarity for the output signal of said subtracting means.

15. A ghost elimination device according to claim 13, wherein said decoding means comprises:

a 4-field delay circuit which delays the input television signal by four fields; a subtracter which provides subtraction between the input signal and output signal of said 4-field delay circuit; a 1H delay circuit which delays the output signal of said subtracter by 1H, where 1H denotes one horizontal scanning period; an integrator which integrates the signal indicative of the polarity sign of output signal of said subtracter; and an inverter/non-inverter which receives the output of said 1H delay circuit and which provides inversion or non-inversion of the polarity of output signal of said 1H delay circuit thereby to unify the polarity of the 1H-delayed output signal in accordance with the output of said integrator.

16. A ghost elimination device according to claim 13, wherein said decoding means comprises:

a 4-field delay circuit which delays the input television signal by four fields; a comparator which compares the input television signal with a predetermined threshold value thereby to extract a signal portion in excess of the threshold value as a comparison result; an integrator which integrates the comparison result; a delay circuit which delays the output of said integrator; and computation means which inverts the polarity of one of the input signal and output signal of said 4-field delay circuit, in accordance with the output of said delay circuit, and thereafter sums the input signal and output signal of said 4-field delay circuit.

17. A ghost elimination device according to claim 13, wherein said decoding means comprises:

a 4-field delay circuit which delays the input television signal by four fields; a subtracter which provides subtraction between the input signal and output signal of said 4-field delay circuit; a comparator which compares the input television signal with a predetermined threshold value thereby to extract a signal portion in excess of the threshold value as a comparison result; and integrator which integrates the comparison result; a delay circuit which delays the output of said integrator; and inverter/non-inverter which provides inversion or non-inversion of the polarity of the output signal of said subtracter in accordance with the output of said delay circuit.

* * * * *